US009680885B2

(12) United States Patent
Yamada

(10) Patent No.: US 9,680,885 B2
(45) Date of Patent: Jun. 13, 2017

(54) INFORMATION PROCESSING APPARATUS AND TERMINAL DEVICE THAT COMMUNICATE WITH EACH OTHER

(71) Applicant: FUJITSU LIMITED, Kawasaki-shi, Kanagawa (JP)

(72) Inventor: Takuma Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 14/015,461

(22) Filed: Aug. 30, 2013

(65) Prior Publication Data

US 2014/0067957 A1    Mar. 6, 2014

(30) Foreign Application Priority Data

Sep. 4, 2012 (JP) .................................. 2012-194149

(51) Int. Cl.
G06F 15/16 (2006.01)
H04L 29/06 (2006.01)
H04L 12/18 (2006.01)
H04L 29/08 (2006.01)

(52) U.S. Cl.
CPC ........ *H04L 65/403* (2013.01); *H04L 12/1822* (2013.01); *H04L 12/1827* (2013.01); *H04L 67/2823* (2013.01)

(58) Field of Classification Search
CPC .................................................. H04L 65/403
See application file for complete search history.

(56) References Cited

U.S. PATENT DOCUMENTS 7,254,384 B2 * 8/2007 Gailey .................... G10L 15/22
                                                          455/412.1
7,991,829 B2 * 8/2011 Takano ............... H04L 12/1818
                                                          235/375
8,019,070 B2    9/2011 Ohkawa
2002/0103715 A1  8/2002 Bennett et al.
(Continued)

FOREIGN PATENT DOCUMENTS

JP    2002-259341    9/2002
JP    2002-352090    12/2002
(Continued)

OTHER PUBLICATIONS

Ricoh Co. LTD., www.ricoh.co.jp/info/110519.html, Retrieved from the Internet: Online date: May 19, 2011, Search date: Jul. 29, 2013. (English Translation).
(Continued)

*Primary Examiner* — Moustafa M Meky
*Assistant Examiner* — SM Z Islam
(74) *Attorney, Agent, or Firm* — Fujitsu Patent Center

(57) ABSTRACT

An information processing apparatus that communicates with a terminal device using a first communication manner, the information processing apparatus includes a processor that: generates a response including first information being described in a first format in response to a request from the terminal device; converts the first information being included in the response and being described in the first format into second information described in a second format conforming to the first communication manner; and transmits the response including the second information to the terminal device in the first communication manner.

13 Claims, 27 Drawing Sheets

(56) References Cited

U.S. PATENT DOCUMENTS

| | | | |
|---|---|---|---|
| 2002/0122203 A1 | 9/2002 | Matsuda | |
| 2005/0044167 A1* | 2/2005 | Kobayashi | G06Q 10/10 709/217 |
| 2008/0043282 A1 | 2/2008 | Tsuboi | |
| 2008/0052384 A1* | 2/2008 | Marl | H04L 12/2807 709/223 |
| 2008/0215795 A1 | 9/2008 | Ishii et al. | |
| 2011/0071997 A1* | 3/2011 | Sullivan | G06F 17/30887 707/706 |
| 2012/0166570 A1* | 6/2012 | Chen | G06F 3/038 709/208 |
| 2012/0259911 A1* | 10/2012 | Meierer | H04B 1/0458 709/203 |

FOREIGN PATENT DOCUMENTS

| | | |
|---|---|---|
| JP | 2002-359718 | 12/2002 |
| JP | 2005-92751 | 4/2005 |
| JP | 2007-66081 | 3/2007 |
| JP | 2007-243433 | 9/2007 |
| JP | 2007-323285 | 12/2007 |
| JP | 2008-46364 | 2/2008 |
| JP | 2008-46984 | 2/2008 |
| JP | 2008-217263 | 9/2008 |

OTHER PUBLICATIONS

Ricoh Co.LTD., http://www.ricoh.com/software/tamago/presenter/ Retrieved from the internet: Online date: unknown Search date: Jul. 29, 2013.

Impress Watch, http://k-tai.impress.co.jp/docs/column/keyword/20110308_431826.html. Retrieved from the internet: Online date: Mar. 8, 2011 Search date: Jul. 29, 2013 (English Translation).

JPOA—Japanese Office Action mailed on Oct. 18, 2016 for corresponding Japanese Patent Application No. 2012-194149, with partial English translation of the relevant part.

JPOA—Japanese Office Action mailed on May 31, 2016 for corresponding JP Application No. 2012-194149, with partial translation of the relevant part.

\* cited by examiner

INFORMATION PROCESSING APPARATUS AND TERMINAL DEVICE THAT COMMUNICATE WITH EACH OTHER

CROSS-REFERENCE TO RELATED APPLICATION

This application is based upon and claims the benefit of priority of the prior Japanese Patent Application No. 2012-194149, filed on Sep. 4, 2012, the entire contents of which are incorporated herein by reference.

FIELD

The embodiments discussed herein are an information processing apparatus, a terminal device, a computer-readable recording medium having stored therein a control program.

BACKGROUND

Conventionally, a technique of displaying a screen (data) being displayed on a computer also on other computers or on a projector in the same network has been applied to various scenes such as an electronic conference. In particular, in accordance with spreading terminal devices such as tablet PCs (hereinafter also called tablet computers), there are provided various devices and applications that achieve cooperation such as an electronic conference using multiple tablet computers.

FIG. 25 is a diagram illustrating an example of the configuration of an electronic conference system 1000. As illustrated in FIG. 25, the electronic conference system 1000 includes a PC 2000, three tablet computers 3000-1 through 3000-3, and a display/projector 4000. Hereinafter, when the tablet computers 3000-1 through 3000-3 are not discriminated from one another, the tablet computers 3000-1 through 3000-3 are each referred to the tablet computer 3000.

The PC 2000 is an information processing apparatus that functions as a host (server) that carries out an electronic conference.

The PC 2000 is connected to the tablet computer 3000-1 via cables 1000a-1 and 1000b-1, to the tablet computer 3000-2 via cables 1000a-2 and 1000b-2, and to the tablet computer 3000-3 via cables 1000a-3 and 1000b-3. Furthermore, the PC 2000 is connected to a non-illustrated network such as Internet, and has a function of a Dynamic Host Configuration Protocol (DHCP) server that sets the connection of each tablet computers 3000 to the network. Hereinafter, when the cables 1000a-1 to 1000a-3 are not discriminated from one another, the cables 1000a-1 to 1000a-3 are each simply referred to as the cable 1000a; and when the cables 1000b-1 to 1000b-3 are not discriminated from one another, the cables 1000b-1 to 1000b-3 are each simply referred to as the cable 1000b.

The PC 2000 has a function of a Web server that generates the data responsive to requests from the tablet computers 3000 and outputs the generated data to the respective tablet computers 3000.

The PC 2000 has an additional function as a file sharing server that holds files forwarded from the tablet computers 3000, such as presentation data to be used in an electric conference. The Web server may include a reference to a shared file stored in the file sharing server in a response generated in response to a request from one of the tablet computers 3000.

The PC 2000 is connected to the display/projector 4000 via a cable 1000c. The PC 2000 displays the contents of data generated by the Web server on the display/projector 4000 in response to an instruction from the tablet computer 3000.

The display/projector 4000 is a display device or a projector that reproduces the data output from the PC 2000.

The tablet computers 3000 are terminal devices that participants in an electronic conference use and each have a Universal Serial Bus (USB) terminal. Each tablet computer 3000 is connected to the PC 2000 via a Local Area Network (LAN). Here, the cables 1000a are LAN cables, and the cables 1000b are USB-to-LAN cables each having a USB terminal to be coupled to a tablet computer 3000 on one end and a LAN terminal to be coupled to the cable 1000a on the other end.

Next, description will now be made in relation to examples of the software configurations and operation of the PC 2000 and the tablet computers 3000 with reference to FIGS. 26 and 27, focusing on the function as the Web server of the PC 2000.

FIG. 26 is a diagram illustrating an example of the software configurations of the PC 2000 and the tablet computers 3000 of FIG. 25, and FIG. 27 is a diagram illustrating an example of operation of the PC 2000 and the tablet computers 3000 of FIG. 25.

As illustrated in FIG. 27, when one of the tablet computers 3000 is starting an electronic conference, the tablet computer 3000 in an user mode 3100, which is one of the operation modes of the processor of the tablet computer 3000, issues a request to start an electronic conference on a browser 3200 (step S101). In the example of FIG. 27, "GET/app/start HTTP/1.0" represents the request to start an electronic conference, and "192.168.1.2" represents the Internet Protocol (IP) address of the PC 2000, which is the destination of the request.

After the browser 3200 issues a request using a framework 3300 and a library 3400, the tablet computer 3000 in a kernel mode 3500, which is another one of the operation modes of the processor, prepares to transmit a request by the network subsystem 3600. Then, a LAN driver 3700 transmits the request to the PC 2000 via the LAN (step S102).

In the PC 2000, a LAN driver 2200 in a kernel mode 2100 receives the request and a kernel-mode network driver 2300 sends the received request to a user-mode network driver 2500 of a user mode 2400. An application 2600 of the Web server receives the request and generates a response corresponding to the Uniform Resource Identifier (URI), that is "/app/start", of the requested data and then outputs the response (step S103). In the example of FIG. 27, the response is described in the HyperText Markup Language (HTML) format that the browsers 3200 of the tablet computers 3000 can display thereon (see <Request and Response> in FIG. 27).

The response is transmitted from the PC 2000 to the tablet computer 3000 in the reverse direction of the request (step S104). In the tablet computer 3000, the response received by the LAN driver 3700 is passed to the browser 3200 in the reverse direction of the request. Upon receipt of the request, the browser 3200 carries out displaying processing and others on the basis of the response (step S105).

When the user of the tablet computer 3000 selects a predetermined link (e.g., " . . . /overview") based on the response displayed on the browser 3200, the browser 3200 issues a request to the selected link. In this manner, the tablet computer 3000 repeats the procedure of S101 to S105.

The procedure of steps S101 to S105 is carried out between the PC 2000 and the respective tablet computers 3000-1 to 3000-3 independently from one another. Accordingly, during an electronic conference, the respective users refer to the same screen provided by the PC 2000 (Web server), which is exemplified a screen displaying by the presentation material of the current speaker, through their own tablet computers 3000. One of the tablet computers 3000 is allowed to instruct the PC 2000 to switch the screen (e.g. presentation material) to be displayed on the display/projector 4000.

As illustrated in FIGS. 25-27, the electronic conference system 1000 allows the tablet computers 3000 to refer to the same screen as that of the PC 2000 (Web server), so that the electronic conference can be held.

A known related art achieves the screen mirroring function of the PC by a file system (a Hard Disk Drive (HDD) and a memory) of a small box connected to multiple PCs via a connection interface such as USB and the Operating Systems (OSs) of the PCs (e.g., Patent Literature 1).

Another known related technique is an application for electronic conferences and presentations using the Wireless Fidelity (Wi-Fi) communication function (e.g., Non-Patent Literature 1 or Non-Patent Literature 2). In this technique, the tablet computer of the host connected to Wi-Fi starts the electronic conference. After that, tablet computers connected to the same Wi-Fi participates in the electronic conference and downloads the conference material from the tablet computer of the host. In this technique, when the page of the conference material forwarded on the tablet computer of the current speaker, the page of the conference material being displayed on the remaining tablet computers are also automatically forwarded.

[Patent Literature 1] Japanese Laid-open Patent Publication No. 2005-92751

[Non-Patent Literature 1] RICOH, "Releasing Application "RICOH TAMAGO Presenter" for paperless conference and presentation using iPad" (online) May 19, 2011, (retrieved) Apr. 20, 2012 in Internet, URL: "www.ricoh.co.jp/info/110519.html"

[Non-Patent Literature 2] RICOH, "RICOH TAMAGO Presenter", (retrieved) Apr. 20, 2012 in Internet, URL: "www.ricoh.co.jp/software/tamago/presenter/"

The electronic conference system 1000 of FIG. 25 may have inconvenience due to the following constrains (i) to (iii) when being put into practice.

(i) For the security reason, the browser 3000a may be prohibited from uploading files onto the PC 2000. In this case, the tablet computers 3000 upload files to the PC 2000 (file sharing server) using a predetermined application. However, some specifications of tablet computers 3000 do not simultaneously run the browser 3200 and such application.

(ii) The PC 2000 is incapable of accessing files stored in a tablet computer 3000 through the LAN.

(iii) If the OS of the tablet computer 3000 is an Android (trademark) OS, the specification of the OS prevents the tablet computer 3000 from connecting to an ad-hoc network, that is, to the PC 2000.

Carrying out screen mirroring among the multiple PCs using the small box, the above related technique preferably includes high-speed communication function and high-performance hardware for the small box and the PCs. For the above, the related technique may have a difficulty in conducting an electronic conference using devices and environment already exist. This means that additional cost is entailed in order to introduce equipment for the electronic conference.

Furthermore, the other related technique enables multiple tablet computers connected via Wi-Fi to refer to the same files. This technique allows each tablet computer to access an external network, such as Internet or Intranet of a company via one or more access points. This involves security risks such as leaking the presentation material to the third party and invading Intranet through the tablet computers.

The above respective techniques may involve various problems due to communication manners between a tablet computer and a PC and among tablet computers. These problems hinder introduction and execution of an electronic conference using multiple tablet computers or reduce security.

The above description assumes that an electronic conference is held using multiple tablet computers, but is not limited to this. Various kind of cooperation carried out with multiple terminal devices involves the same problems.

SUMMARY

According to an aspect of the embodiments, an information processing apparatus that communicates with a terminal device using a first communication manner, the information processing apparatus including a processor that: generates a response including first information being described in a first format in response to a request from the terminal device; converts the first information being included in the response and being described in the first format into second information described in a second format conforming to the first communication manner; and transmits the response including the second information to the terminal device in the first communication manner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will now be described with reference to the accompanying drawings.

Figure 1:
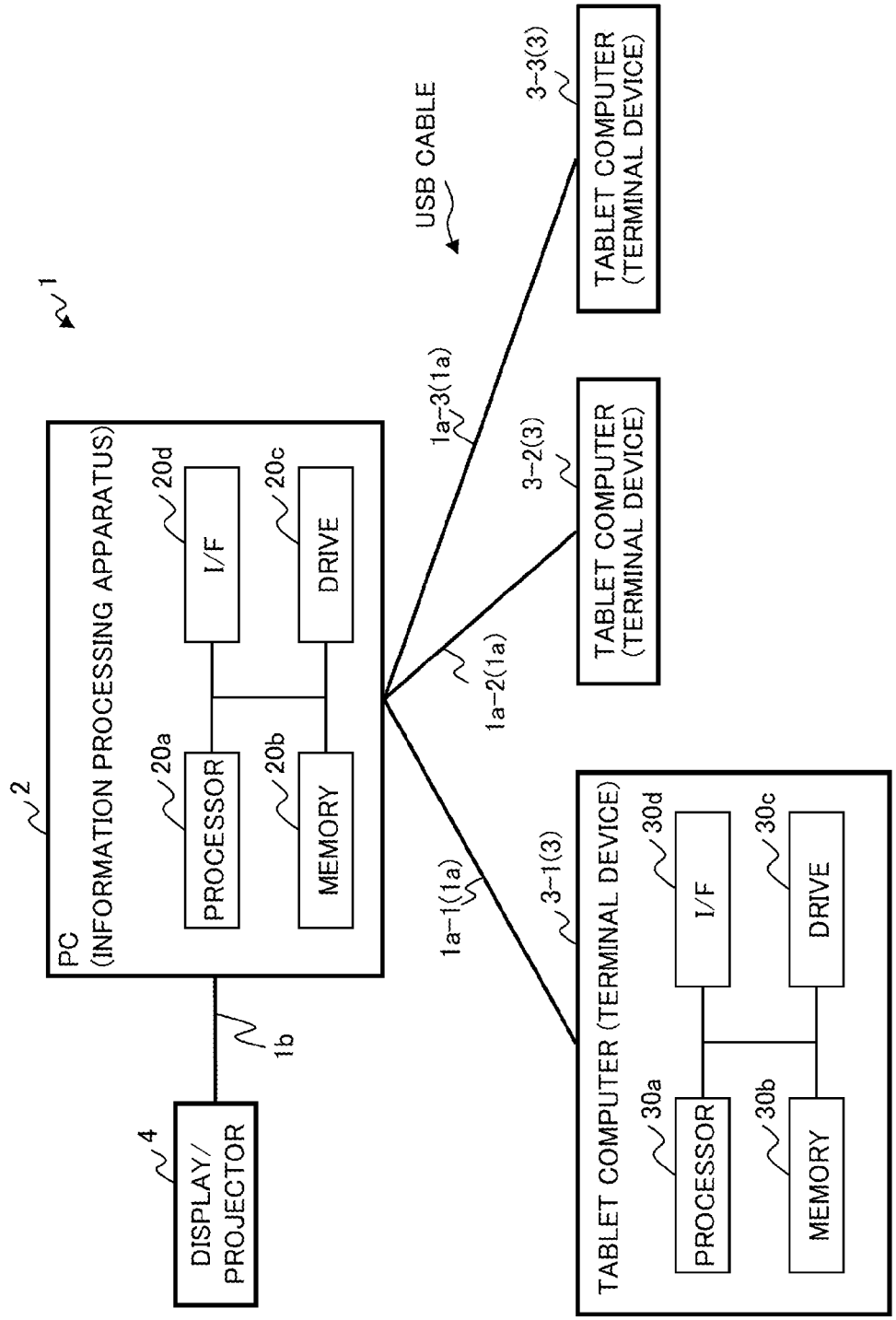
FIG. 1 is a diagram illustrating an example of the configuration of a cooperative conference assist system according to a first embodiment.

(1) First Embodiment
(1-1) Cooperation Assist System:

FIG. 1 is a diagram illustrating an example of the configuration of a cooperation assist system 1 according to a first embodiment. As illustrated in FIG. 1, the cooperation assist system 1 includes a PC 2, multiple (e.g., three) tablet computers 3-1 through 3-3, and a display/projector 4. Hereinafter, when the tablet computers 3-1 through 3-3 are not discriminated from one another, the tablet computers 3-1 through 3-3 are each referred to the tablet computer 3).

The PC 2 is an information processing apparatus that functions as a host (server) that assists cooperation. Examples of cooperation are meetings such as electronic conferences, business negotiations, lectures, and sessions; and entertainment such as movie appreciation and video games. Hereinafter, the description of the first embodiment assumes the cooperation to be an electronic conference.

The PC 2 is connected to the tablet computers 3-1 through 3-3 via cables 1a-1 through 1a-3, respectively. Hereinafter, when the cables 1a-1 through 1a-3 are not discriminated from one another, the cables 1a-1 through 1a-3 are each referred to the cable 1a. An example of the cable 1a is a serial cable such as a USB cable. Alternatively, the cable 1a may be replaced by wireless communication confirming to, for example, Bluetooth (registered trademark) as to be detailed below. The description of the first embodiment assumes the cable 1a to be a USB cable. For this purpose, the PC 2 includes multiple USB terminals to be connected to the cables 1a-1 through 1a-3.

The PC 2 has a function of a Web server that generates the data in response to a request from a tablet computer 3 and outputs the created data to the tablet computer 3.

Furthermore, the PC 2 is capable of accessing data that the tablet computer 3 holds, such as presentation data (shared file) to be used in an electric conference, through the cable 1a. The Web server may include a reference to a shared file stored in the table computer 3 that issues the request or stored in another tablet computer 3 in the response generated in response to a request from one of the tablet computers 3.

The PC 2 is connected to the display/projector 4 via cable 1c, which is any Audio Visual (AV) cable such as a High-Definition Multimedia Interface (HDMI) cable. The PC 2 controls displaying of the contents of various data generated by the Web server on the display/projector 4 in response to the instruction from a non-illustrated input device such as a keyboard or a mouse or an instruction from a tablet computer 3. Specifically, the PC 2 can display the contents of data generated by the Web server or shared files that the tablet computers 3 holds on the display/projector 4.

The display/projector 4 is a display device or a projector that reproduces the data output from the PC 2.

The tablet computers 3 are terminal devices that participants in an electronic conference (cooperation) use and each have a USB terminal. Each tablet computer 3 establishes USB connection with the PC 2.

As illustrated in FIG. 1, the PC 2 includes a processor 20a, a memory 20b, a drive 20c, and an Interface (hereinafter sometimes abbreviated to I/F) 20d while each tablet computer 3 includes a processor 30a, a memory 30b, a drive 30c, and an I/F 30d.

The processors 20a and 30a are connected to the respective corresponding memories 20b and 30b, drives 20c and 30c, and I/Fs 20d and 30d via busses (and controllers or the like), and serve as processing units, such as Central Processing Units (CPUs), that carries out various controls and calculations.

The processors 20a and 30a achieve various functions by carrying out various programs stored in the corresponding memories 20b and 30b or non-illustrated Read Only Memories (ROMs). In the first embodiment, the processors 20a and 30a carryout respective control programs stored in the memories 20b and 30b and thereby achieve the functions of the PC 2 and the tablet computer 3 to be detailed below.

The memories 20b and 30b are memory devices that temporarily store various data and programs. When the processors 20*a* and 30*a* are to carry out programs, data and programs are stored and expanded in the memories 20*b* and 30*b*. Examples of the memories 20*b* and 30*b* are volatile memories such as Random Access Memories (RAMs).

The drives 20*c* and 30*c* are exemplified by magnetic disk devices such as HDDs and/or semiconductor drive devices such as Solid State Drives (SSDs), and are hardware devices that hold various data and programs.

The I/Fs 20*d* and 30*d* are interfaces that control communication of the PC 2 and the tablet computer 3 with devices connected to the PC 2 and the tablet 3, respectively. For example, the I/F 20*d* includes various adaptors connectable to the cable 1*a* that is a USB cable, to the cable 1*b* that is an AV cable, and to an input device such as a non-illustrated keyboard or mouse. The I/F 30*d* includes an adaptor connectable to the cable 1*a* that is a USB cable.

(1-2) Manner of Communication Between the PC and the Tablet Computers:

Next, brief description will now be made in relation to a manner of communication between the PC 2 and the tablet computers 3.

As described above, the PC 2 and each tablet computer 3 of the first embodiment are connected to each other via a USB cable. Here communication via the USB is classified into three modes of a USB device mode, a USB host mode, and a USB accessory mode.

Figure 23:
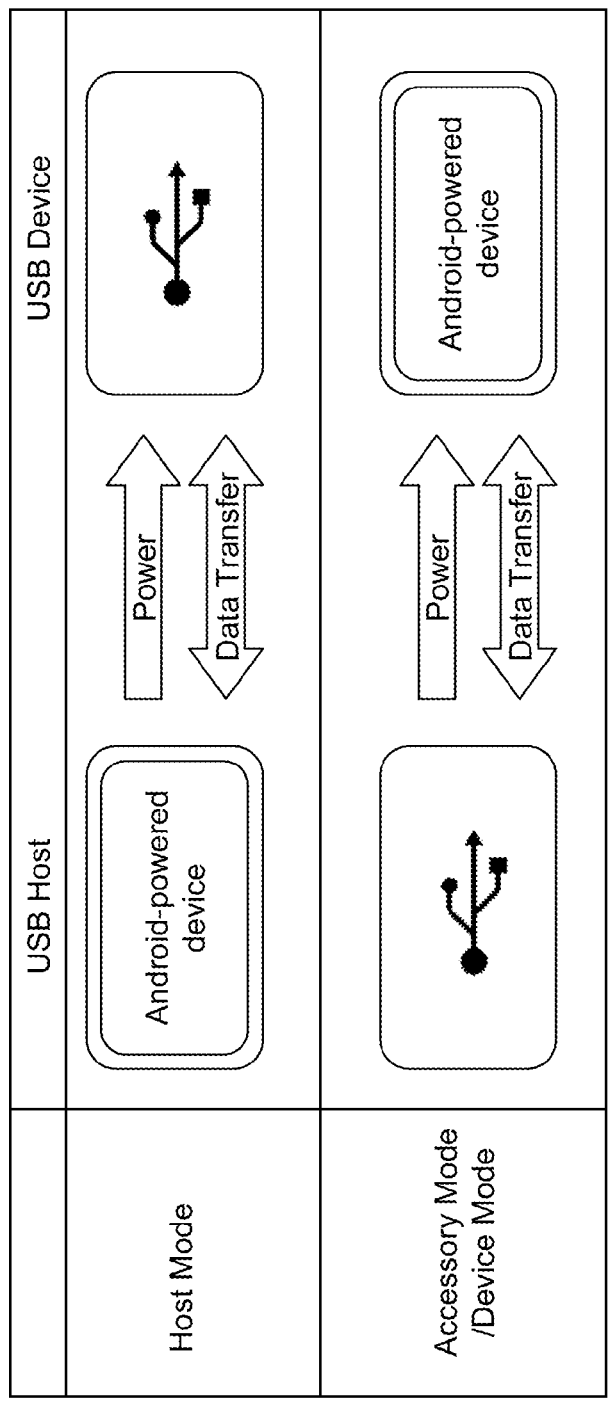
FIG. 23 is a diagram denoting a USB host mode, a USB accessory mode, and a USB device mode.
Figure 24:
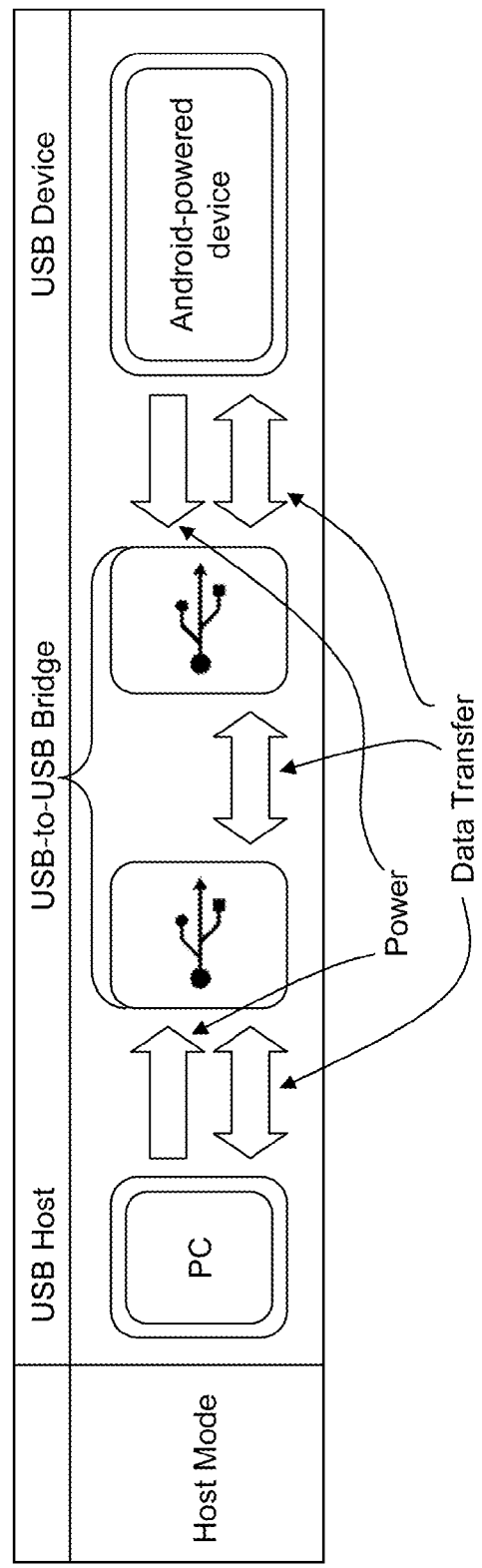
FIG. 24 is a diagram illustrating an example of a communication between a PC and a tablet computer in a USB host mode.
Figure 25:
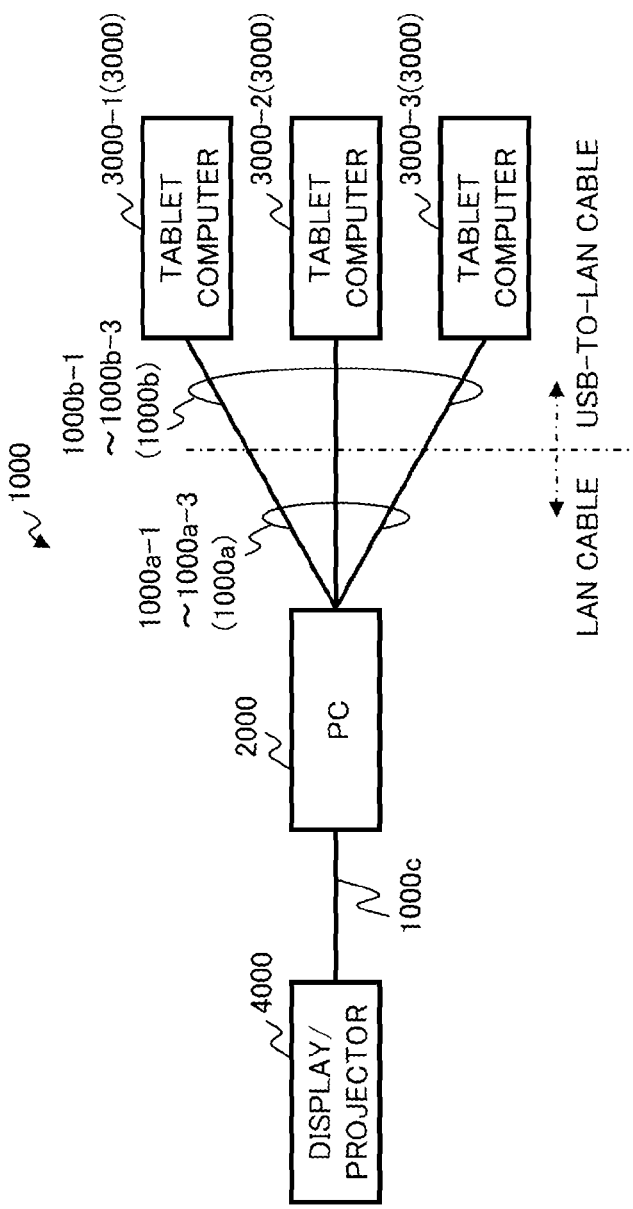
FIG. 25 is a diagram illustrating an example of a configuration of an electronic conference system.
Figure 26:
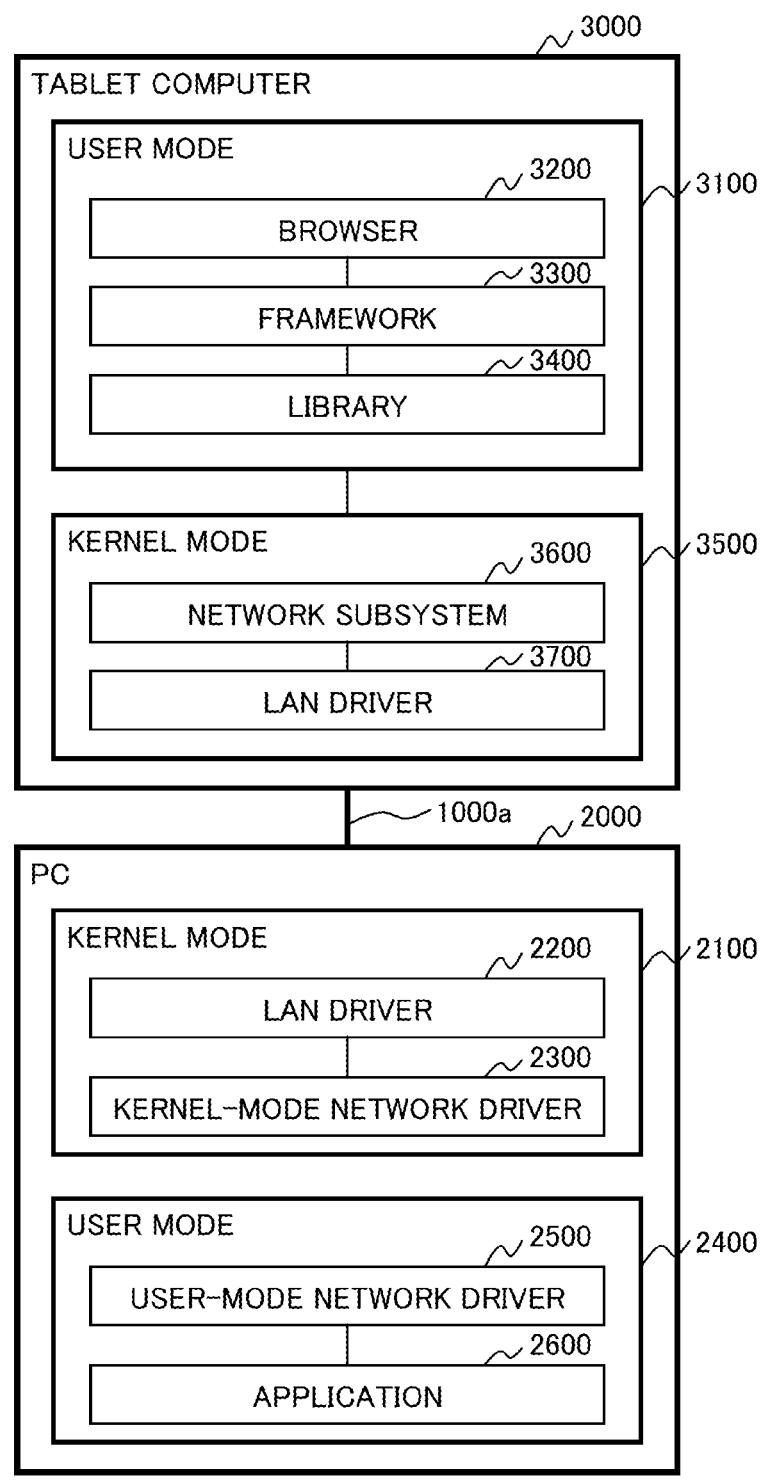
FIG. 26 is a diagram illustrating an example of software configurations of a PC and a tablet computer of FIG. 25.
Figure 27:
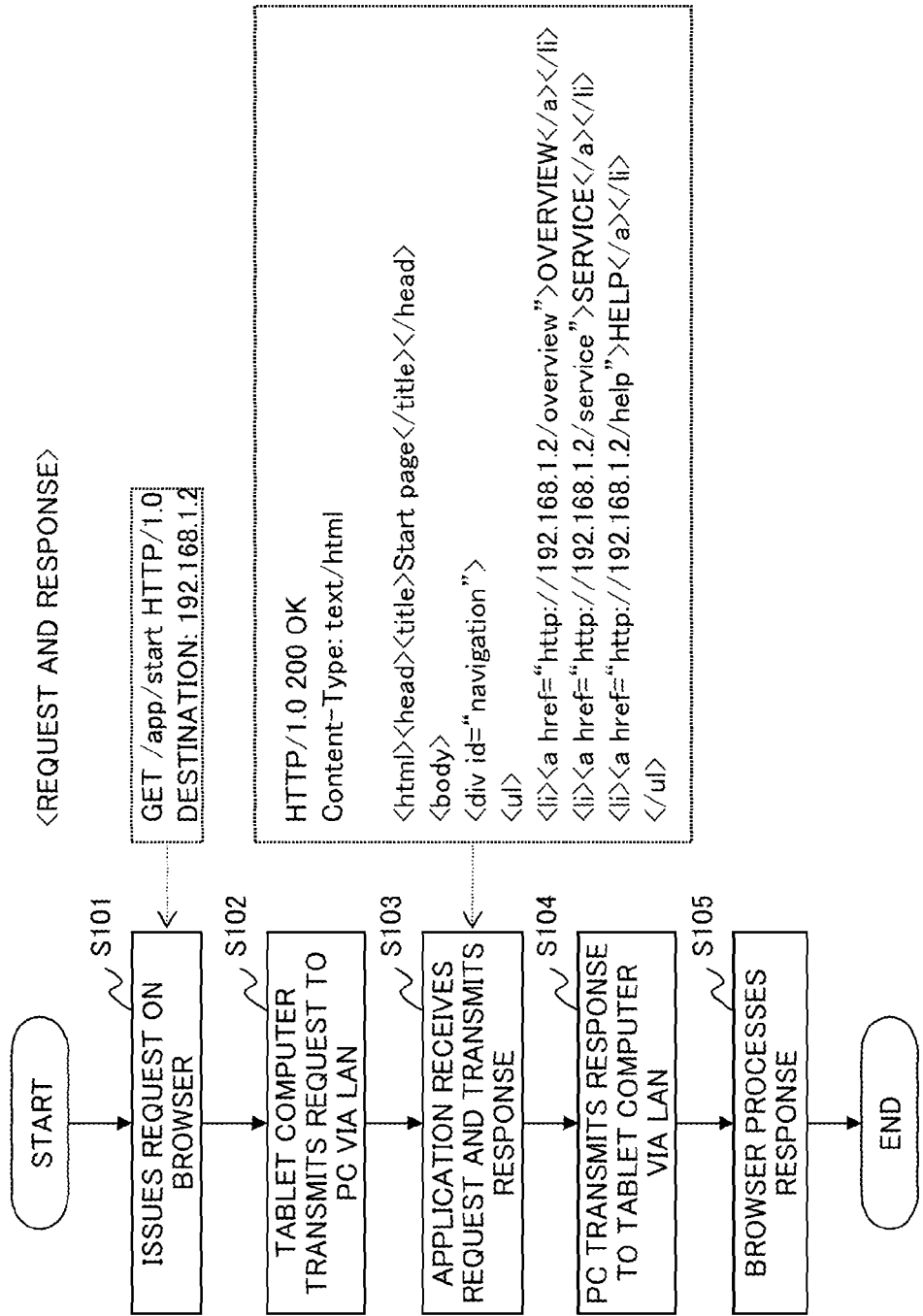
FIG. 27 is a flow diagram illustrating an example of a succession of procedural steps of operation performed by a PC and a tablet computer of FIG. 25.

FIG. 23 is a diagram denoting the USB host mode, the USB accessory mode, and the USB device mode; and FIG. 24 is a diagram illustrating an example of communication between the PC 2 and a tablet computer 3 in the USB host mode. The examples of FIGS. 23 and 24 are related to Android 3.1 (Application Program Interface (API) level 12) and later or Android 2.3.4 (API level 10) and later. Description to be made with reference to FIGS. 23 and 24 assumes that the tablet computers 3 are devices (hereinafter, sometimes referred to as Android devices) under the control of Android OS.

As depicted in the upper row of FIG. 23, in the USB host mode, the Android device serves as a communication master, and therefore a USB cable is connected to the USB connector (type A) on the Android device. The USB host mode is used to, for example, connect the Android device to a peripheral device. The Android device prepares therein function to communicate with a peripheral device through an application beforehand.

In the meantime, as illustrated in the lower row of FIG. 23, in the USB accessory mode, the Android device serves as a communication slave, and therefore a USB cable is connected to the USB connector (type B) on the Android device. The USB accessory mode is used to, for example, connect the PC 2 and the Android device to each other. The Android device prepares therein function to communicate with the PC 2 through an application beforehand.

As illustrated in the lower row of FIG. 23, in the USB device mode, the PC 2 initiates communication with an Android device. However, in this mode, the Android device does not prepare function to communicate with the PC 2 through an application. In the USB device mode, the PC 2 is allowed to operate part (e.g., Secure Digital (SD) card) of the storage of the Android device. While the PC 2 is operating part of the storage of the Android device, the Android device is not allowed to access to the part of the storage that the PC 2 is currently accessing.

A device having a USB connector (type A) being connected to a USB cable is capable of supplying power to a device having a USB connector (type B) being connected to the other end of the same USB cable. For example, when a USB cable connects the USB connector (type A) of the PC 2 with the USB connector (type B) of an Android device, the PC 2 is capable of supplying power to the Android device. In contrast, when a USB cable connects a USB connector (type A) of an Android device with a USB connector (type B) of a peripheral device such as a communication adaptor or a USB memory, the Android device is capable of supplying power to the peripheral device.

The PC 2 includes only USB connectors (type A); each peripheral device includes only USB connectors (type B); and most Android devices include USB connectors (type A/B). A USB connector (type A/B) is connectable to a USB cable of type A and type B.

Among the above three operational modes, the PC 2 and an Android device are communicate with each other in the USB device mode and in USB accessory mode. Note that, the configuration of FIG. 24 enables the PC 2 and an Android device to communicate with each other in the USB host mode. Specifically, as denoted in FIG. 24, the PC 2 and Android device access two peripheral devices serving as a USB-to-USB bridge in the USB host mode. With this configuration, the PC 2 and the Android device are capable of communicating with each other through the USB-to-USB bridge.

Each tablet computer 3 of the first embodiment has a function of the USB accessory mode.

As described above, communication in a predetermined manner, such as USB (and likewise Bluetooth), fixes a communication master to one end. In other words, either one of two entities connected to each other by a USB cable or Bluetooth is allowed to initiate the communication. In the first embodiment, since the PC 2 serves as a host to tablet computers 3 in the USB accessory mode, the PC 2 is a communication master that initiates the communication.

On the other hand, the tablet computers 3 of the first embodiment, which are however under the master constraint, are allowed to obtain data to be used for the electronic conference from the PC 2 (i.e., Web server) serving as a communication master, through the communication function for electronic conference (cooperation) that the PC 2 and the tablet computers 3 have. The communication function for electronic conference will be detailed below. This means that, the cooperation assist system 1 of the first embodiment achieves an electronic conference by carrying out pseudo-bidirectional communication using to a communication manner having a master constraint in the method to be detailed below.

Specifically, each tablet computer 3 includes a new schema adopted to the USB. The tablet computer 3 issues a request to a URL in a schema format on the browser and communicates with the PC 2 via USB. The PC 2 converts the request received from the tablet computer 3 through the USB cable into the network (IP) format and executes a network compatible application, for example the Web server. Then the PC 2 generates a response to the request from the tablet computer 3 through the function of the Web server, converts the created response into a new schema format conforming to USB, and sends the converted response to the tablet computer 3 through the USB cable.

Thereby, the tablet computer 3 is allowed to display, on the browser, data from the Web server of the PC 2 by access through the USB communication manner.

Since the tablet computer 3 operates in the USB accessory mode, the PC 2 is allowed to access files (shared files) that the tablet computer 3 holds through the USB cable. Differently from the operation in the USB device mode, the tablet computer 3, which is concurrently in the USB accessory mode, is allowed to access the shared filed that the PC 2 is accessing.

Furthermore, since the tablet computer 3 communicates with the PC 2 through the USB connection, not through the LAN connection, the tablet computer 3, if operates under the Android OS, can escape from inconvenience that the tablet computer 3 is not allowed to be connected to the ad-hoc network, that is, to the PC 2.

Hereinafter, the PC 2 and the tablet computer 3 will now be detailed.

Figure 2:
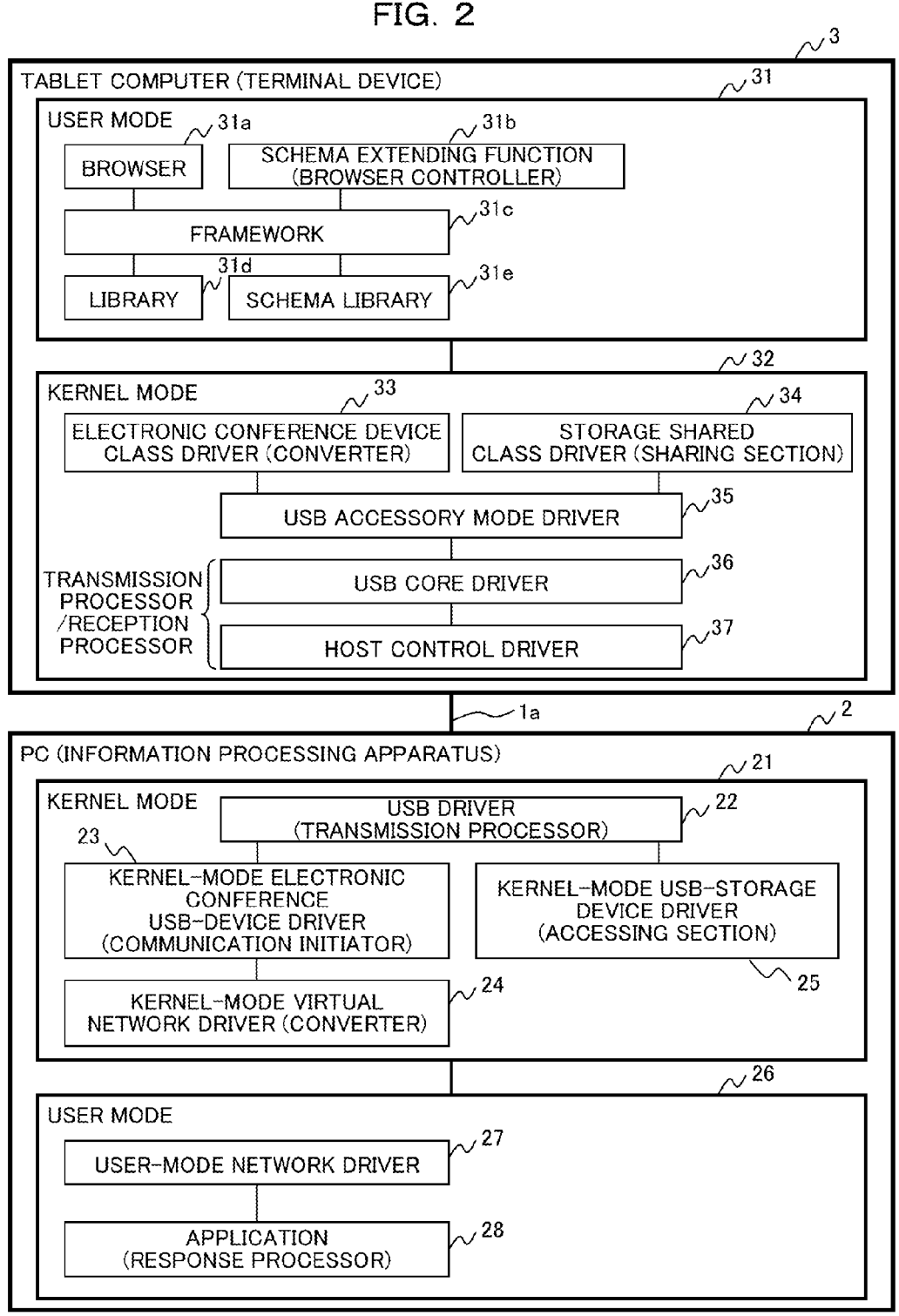
FIG. 2 is a diagram illustrating an example of software configurations of a PC and a tablet computer of FIG. 1.

(1-3) Example of the Configurations of the PC and the Tablet Computers:

FIG. 2 is a diagram illustrating an example of the software configurations of the PC 2 and the tablet computer 3 of FIG. 1.

As illustrated in FIG. 2, each tablet computer 3 has functions for a kernel mode 32 and a user mode 31. The kernel mode 32 and the user mode 31 are operation modes of the processor 30a included in the tablet computer 3. The kernel mode 32 allows the processor 30a to carry out various operations and use resources without limitation. Namely, the processor 30a is allowed to carry out processing on the kernel level in the kernel mode 32. On the other hand, the user mode 31 limits the processor 30a to carry out various operations and use resources. Namely, the processor 30a is allowed to execute applications on the user level in the user mode 31.

The user mode 31 of the first embodiments provides the functions of the browser 31a, a schema extending function 31b, a framework 31c, a library 31d, and schema library 31e.

The browser 31a is capable of issuing a request to the PC 2 (Web server) based on a URL (information) described in the schema format (first format), such as Hyper Text Transfer Protocol (HTTP), that the browser 31a previously has. In addition, the browser 31a analyzes a response (data) described in the HTML format and displays the analyzed response on the display.

The schema extending function (browser controller) 31b causes the browser 31a to issue a request based on a URL described in a new schema format (second format) conforming to USB (predetermined communication manner) serving as the communication manner with the PC 2. When a request described in a new schema format is issued from the browser 31a, the schema extending function 31b passes the request to an electronic conference device class driver 33, which is in a lower layer (i.e., the kernel) than the layer (i.e., application) that the browser 31a belongs to. Hereinafter, the description assumes that the new schema format, that is the schema format for USB, is "usbconf" and that a request, that is a URL described in the schema format for USB, is "usbconf://server/app/start".

A URL described in a schema format that the browser 31a previously has is a character string that specifies the resource in communication using another communication manner (second communication manner, such as LAN) different from the communication manner via USB. On the other hand, a URL described in the schema format for USB is a character string that specifies the resource in the communication manner via USB.

The framework 31c provides execution environment of the browser 31a and the schema extending function 31b. The library 31d is an aggregation of codes that provide at least part of function for executing the browser 31a. The schema library 31e is an aggregation of codes that provide at least part of function for executing the schema extending function 31b.

The kernel mode 32 of the first embodiment provides the functions of the electronic conference device class driver 33, a storage shared class driver 34, a USB accessory mode driver 35, a USB core driver 36, and a host control driver 37.

The electronic conference device class driver (converter) 33 provides the tablet computer 3 with a communication function for an electronic conference. Specifically, the electronic conference device class driver 33 converts a request which is passed by the schema extending function 31b and which is destined for the PC 2 into a format that the PC 2 can recognize. For example, upon receipt of a request "usbconf://server/app/start" described in the schema format for USB, the electronic conference device class driver 33 converts the received request into an HTTP request, such as "GET/app/start HTTP/1.0" to the Web server.

The storage shared class driver (sharing section) 34 provides the tablet computer 3 being operating in the USB accessory mode with a function to share at least part of the storage of the tablet computer 3, i.e., part of the drive 30c such as an SSD with the PC 2, so that the PC 2 can browse the data in the shared part.

The USB accessory mode driver 35 provides the tablet computer 3 with the function of the USB accessory mode. The USB core driver 36 provides various functions, such as protocols, for the communication with the PC 2 via USB. The host control driver 37 controls a non-illustrated USB host controller included in the tablet computer 3.

The USB core driver 36 and the host control driver 37 collectively function as a transmission processor that transmits the request converted by the electronic conference device class driver 33 to the PC 2 via a communication manner of USB. The USB core driver 36 and the host control driver 37 collectively function as a reception processor that receives a response to a request, the response being sent from the PC 2 and including a URL described in the schema format for USB, via the communication manner of USB. The response sent from the PC 2 will be detailed below.

As illustrated in FIG. 2, the PC 2 includes the functions of kernel mode 21 and the user mode 26. The kernel mode 21 and the user mode 26 are operation modes of the processor 20a included in the PC 2.

The kernel mode 21 of the first embodiment provides functions of a USB driver 22, a kernel-mode electronic conference USB-device driver 23, a kernel-mode virtual network driver 24, and a kernel-mode USB-storage device driver 25.

The USB driver (transmission processor) 22 controls USB communication between the PC 2 and each tablet computer 3. For example, the USB driver 22 controls anon-illustrated USB host controller included in the PC 2, and provides various functions, such as a protocol, for communication with tablet computers 3 via USB.

The USB driver 22 of the first embodiment transmits the response converted by the kernel-mode virtual network driver 24 to be detailed below to a tablet computer 3 via a communication manner of USB.

The kernel-mode electronic conference USB-device driver (communication initiator) 23 is a class driver that provides the PC 2 with a function of communication for an electronic conference. Specifically, the kernel-mode electronic conference USB-device driver 23 sends the tablet computer 3 an query (signal) as permission for initiating communication via USB.

The tablet computer 3 of the first embodiment, which operates in the USB accessory mode, restricts the communication master (origin) via USB to the PC 2. For the above, the kernel-mode electronic conference USB-device driver 23 regularly transmits a query about initiating communication for an electronic conference to each tablet computer 3. Receipt of the query from the kernel-mode electronic conference USB-device driver 23 causes a tablet computer 3 to issue a request from the browser 31a to the PC 2. Thereby, pseudo-bidirectional communication can be accomplished between the PC 2 and tablet computer 3 through a communication manner, such as via USB, having a master constraint.

The kernel-mode virtual network driver (converter) 24 converts a request that is received from the tablet computer 3 through the communication via USB into a request received through a network (IP), and transmits the converted request to the user mode 26.

The kernel-mode virtual network driver 24 further converts a URL which is included in the response from the user mode 26 and which is described in the schema format that the browser 31a previously has and which is included in a response from the user mode 26 into a URL described in a schema format for USB. The PC 2 is capable of obtaining the schema format for USB that the tablet computer 3 newly adds from the tablet computer 3 before (or at the first time of) the USB communication.

Specifically, the kernel-mode virtual network driver 24 allocates virtual IPs (virtual addresses) to the PC 2 and tablet computer 3, and converts URLs included in requests and responses in the event of communication of either direction.

The detailed configuration of the kernel-mode virtual network driver 24 will be described below.

The kernel-mode USB-storage device driver (accessing section) 25 controls access to the shared storage that is shared by the storage shared class driver 34 of each tablet computer 3.

In detail, the kernel-mode USB-storage device driver 25 allows the tablet computer 3 to browse, if a response output from an application 28 to be detailed below includes reference to a shared file stored in the shared storage, the shared file designated by the reference. For example, if the tablet computer 3 requests reference to the shared file designated by the reference, the kernel-mode USB-storage device driver 25 accesses the shared file to be referred and reply to the tablet computer 3 with the result of reference. Alternatively, the kernel-mode USB-storage device driver 25 may obtain the shared file to be referred from the shared storage in advance and may embed the obtained file in the response. In obtaining the shared file from the shared storage in advance, the PC 2 may store the obtained shared file in the storage (the memory 20b or the drive 20c) of the PC 2.

Further alternatively, in response to a request for reference to a shared file in a tablet computer 3 which request is issued from another tablet computer 3, the kernel-mode USB-storage device driver 25 may allow the other tablet computer 3 to access the shared file through the PC 2.

The user mode 26 of the first embodiment provides the functions of a user-mode network driver 27 and the application 28.

The user-mode network driver 27 sends and receives data using IP. For example, the user-mode network driver 27 forwards a request to the application 28 by referring to an IP address (destination) which is included in request and which has undergone the conversion by the kernel-mode virtual network driver 24. The user-mode network driver 27 forwards a response from the application 28 to the kernel mode 21, designating a destination that the application 28 instructs.

The application (application processor) 28 outputs a response including a URL described in the schema format that the browser 31a previously has in response to the request received from a tablet computer 3. An example of the application 28 is a Web server.

The application 28 is capable of including a reference to a file in a shared storage in the tablet computer 3 that has issued the request or another tablet computer 3 into the response to the tablet computer 3.

Specifically, upon receipt of a request to the browsing screen for the presentation material of an electronic conference from a tablet computer 3, the application 28 causes the kernel-mode USB-storage device driver 25 to obtain the list of shared files of all the shared storage. Then the application 28 includes the references of the respective shared files to the response and outputs the response.

Figure 3:
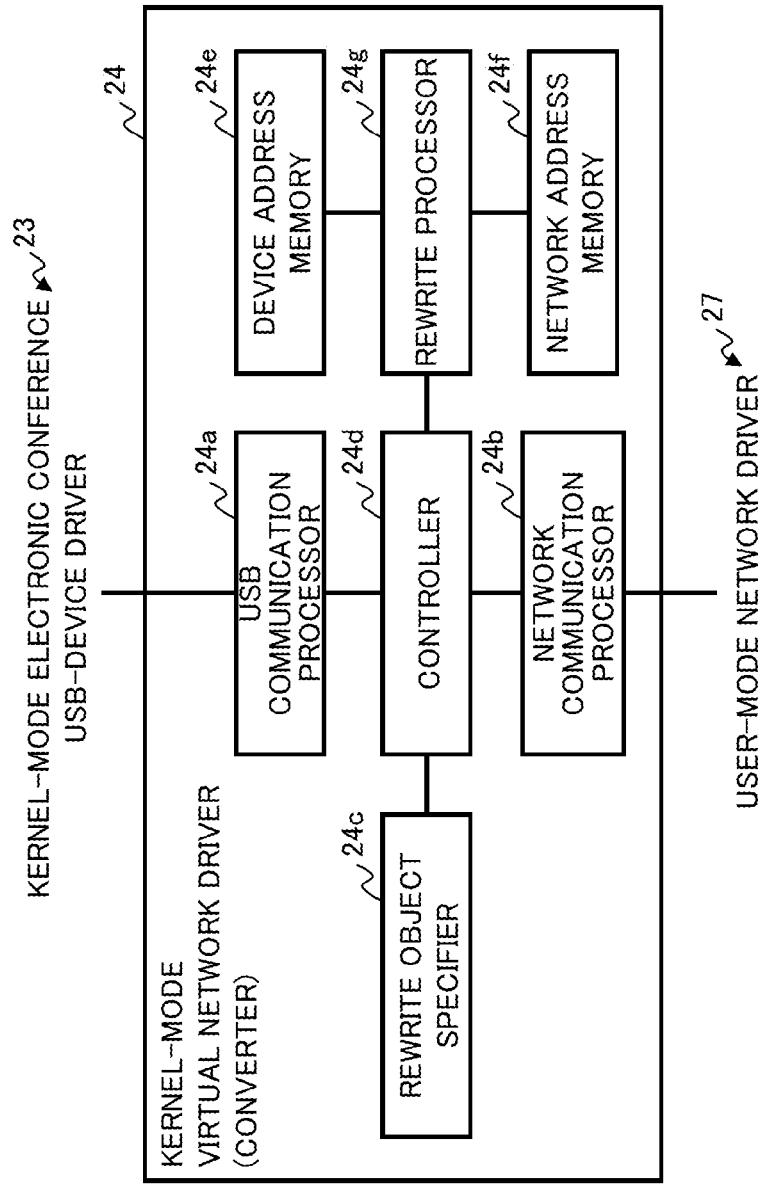
FIG. 3 is a block diagram illustrating an example of a detailed configuration of a kernel-mode virtual network driver of FIG. 2.
Figure 4:
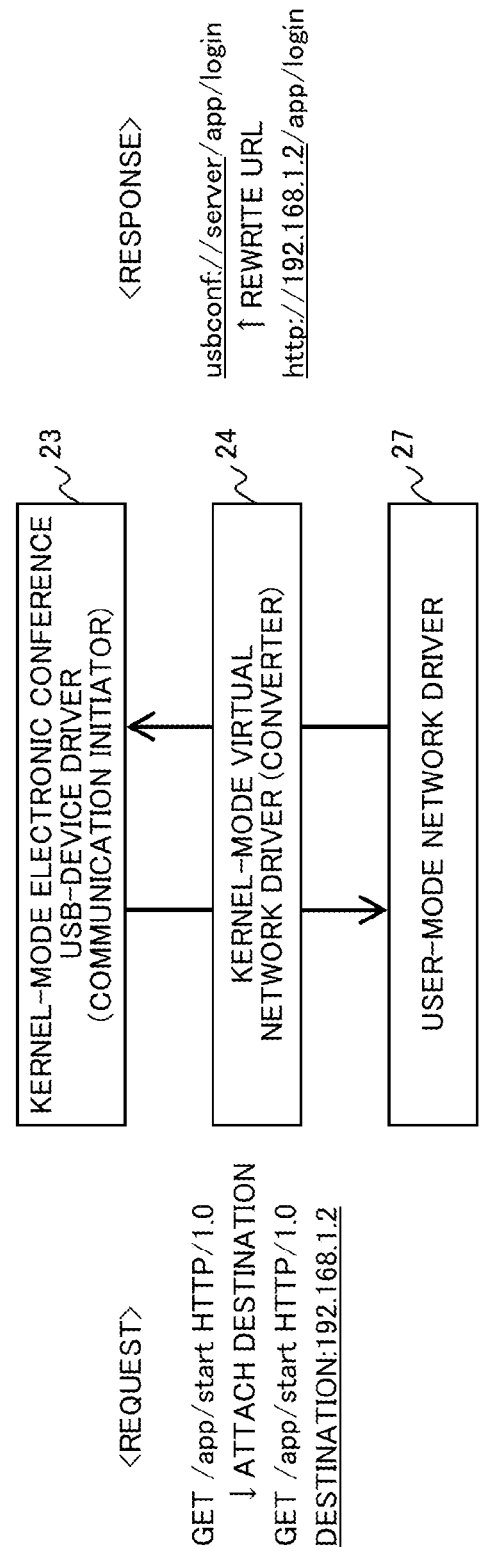
FIG. 4 is a diagram illustrating an example of operation of a kernel-mode virtual network driver of FIG. 2.

(1-3-1) Kernel-mode Virtual Network Driver:

Next, the description will now be made in relation to an example of the detailed configuration of the kernel-mode virtual network driver 24 with reference to FIGS. 3 and 4. FIG. 3 is a block diagram illustrating an example of the detailed configuration of the kernel-mode virtual network driver 24 of FIG. 2, and FIG. 4 is a diagram illustrating an example of operation of the kernel-mode virtual network driver 24.

As illustrated in FIG. 3, the kernel-mode virtual network driver 24 includes a USB communication processor 24a, a network communication processor 24b, a rewrite object specifier 24c, a controller 24d, a device address memory 24e, a network address memory 24f, and a rewrite processor 24g.

The USB communication processor 24a passes a request from the kernel-mode electronic conference USB-device driver 23 to the controller 24d, and also outputs a response obtained by conversion in the controller 24d to the kernel-mode electronic conference USB-device driver 23.

The network communication processor 24b outputs the request containing an IP address attached by the controller 24d to the user-mode network driver 27, and passes a response from the user-mode network driver 27 to the controller 24d.

The rewrite object specifier 24c specifies the data format of the response passed from the network communication processor 24b, and determines whether the specified data format coincides with the predetermined data format. Specifically, the rewrite object specifier 24c determines whether the specified data format is a data format, such as an HTML data, Cascading Style Sheets (CSS) data, and another text data, that has a possibility of containing a link. In other words, the rewrite object specifier 24c determines whether the specified data format of the response has a URL to be rewritten. When the specified data format is determined to have a URL to be rewritten, the rewrite object specifier 24c instructs the controller 24d to rewrite the URL, that is, to convert the response.

On the other hand, when the specified data format is determined not to be rewritten because the data format is of, for example, image, audio, motion picture, and another binary file, the rewrite object specifier 24c does not issue the instruction to the controller 24d, or notifies the controller 24d that the data format of the response is not to be converted.

Upon receipt of a request destined for the Web server from the USB communication processor 24a, the controller 24d instructs the rewrite processor 24g to attach the IP address of the user-mode network driver 27 to the request. Furthermore, upon receipt of a response destined for the tablet computer 3 from the network communication processor 24b, the controller 24d obtains the data format of the response and then passes the data format to the rewrite object specifier 24c, and also issues an instruction whether conversion is to be carried out on the basis of the instruction of the rewrite object specifier 24c to the rewrite processor 24g.

When the controller 24d receives no instruction of conversion or receives a notification that the data format of a response or a request is not to be converted, the controller 24d forwards the response or the request to the corresponding destination without conversion.

The device address memory 24e is a memory region that stores the device addresses of the respective tablet computers 3. The PC 2 obtains the device address from a device at a predetermined timing, such as when the PC 2 is connected to the device for the first time, and stores the obtained address into the device address memory 24e. The network address memory 24f is a memory region that stores the network addresses of the user-mode network driver 27 and other entities. The device address memory 24e and the network address memory 24f may be achieved by at least part of the memory 20b or drive 20c of the PC 2.

The rewrite processor 24g rewrites a request or response, following instruction from the controller 24d. For example, the rewrite processor 24g attaches information which indicates the user-mode network driver 27 (the application 28) and which is described in the schema format that the browser 31a previously has to the request. More specifically, as illustrated in a box <REQUEST> in FIG. 4, the rewrite processor 24g attaches the IP address of the user-mode network driver 27, which is the destination of transmission, to a request to the Web server by referring to the network address memory 24f. Furthermore, as illustrated in a box <RESPONSE> in FIG. 4, the rewrite processor 24g rewrites the URL which is contained in a response from the Web server and which is described in the schema format that the user mode 31 previously has to the schema format for USB.

In the above manner, the kernel-mode virtual network driver 24 attaches the destination of transmission of a request or a response to or rewrites the URL of the request or the response while communication in the corresponding direction is being carried out.

Figure 5:
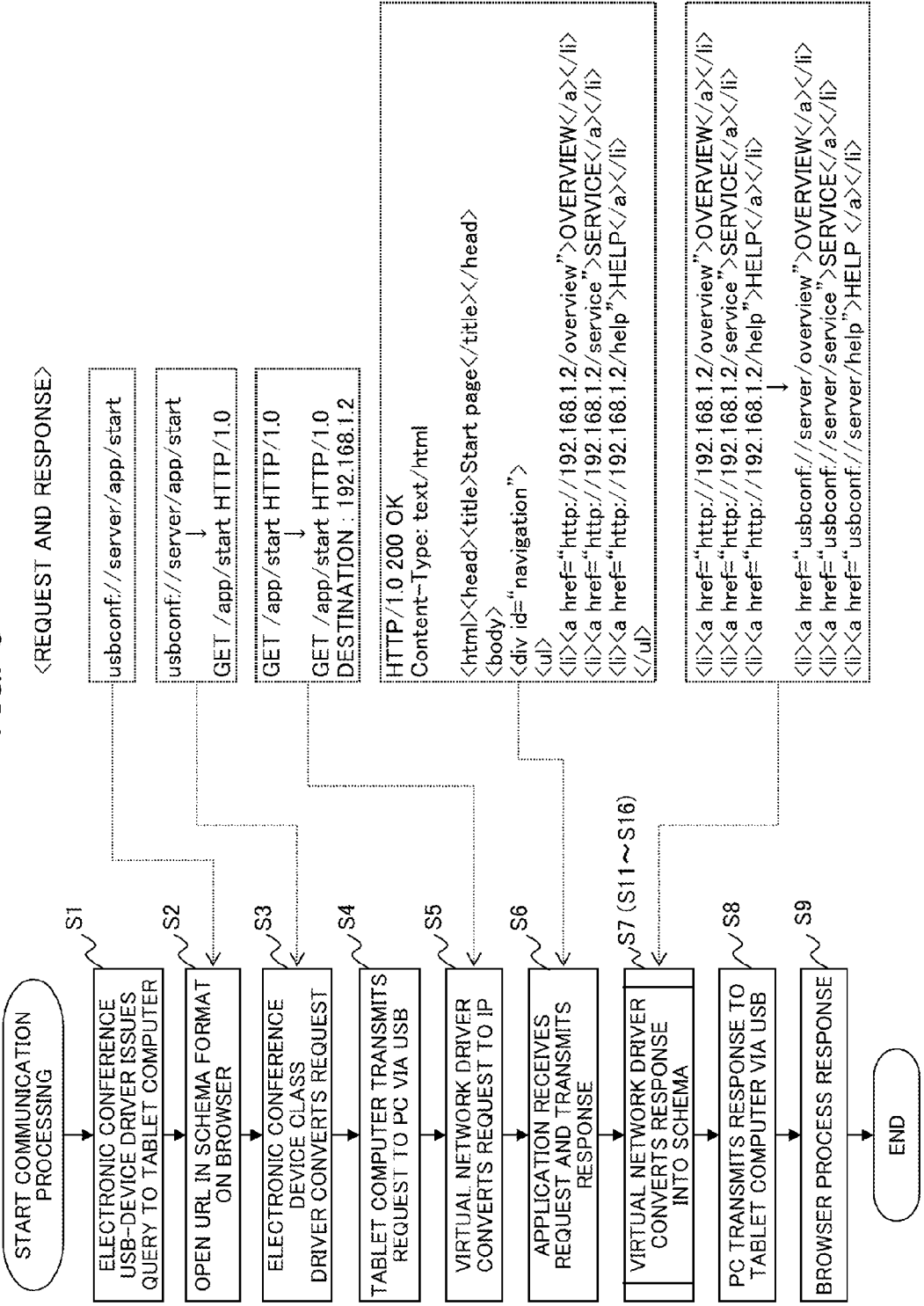
FIG. 5 is a flow diagram illustrating an example of a succession of procedural steps performed by a PC and a tablet computer of FIG. 2.
Figure 6:
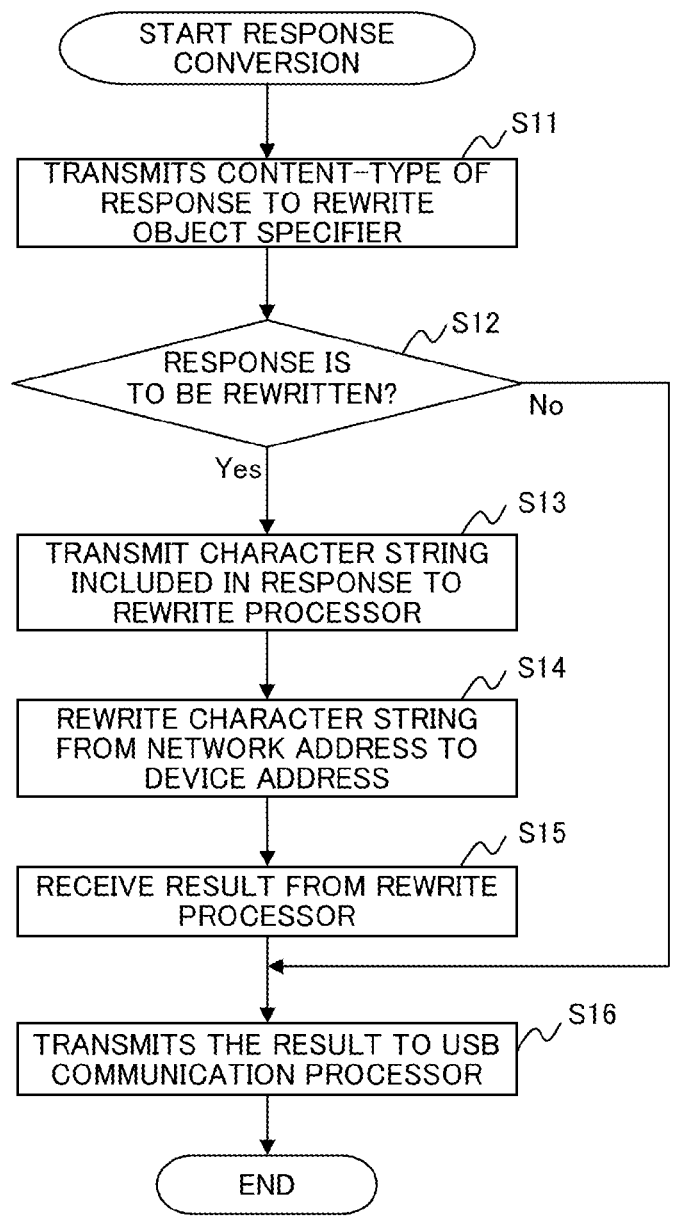
FIG. 6 is a flow diagram illustrating an example of a succession of detailed procedural steps of converting a response of a kernel-mode virtual network driver of FIG. 5.

(1-4) Example of Operation of the PC and the Tablet Computer:

Next, description will now be made in relation to operation of the PC 2 and the tablet computer 3 having the above configurations with reference to FIGS. 5 and 6. FIG. 5 is a flow diagram denoting an example of a succession of procedural steps of communication between the PC 2 and the tablet computer 3; and FIG. 6 is a flow diagram denoting an example of a succession of detailed procedural steps of converting a response by the kernel-mode virtual network driver 24 of FIG. 5.

As denoted in FIG. 5, the kernel-mode electronic conference USB-device driver 23 of the PC 2 regularly issues a query about initiation of communication to the tablet computer 3 (step S1). Upon receipt of the query, the user of a tablet computer 3 opens an URL (e.g., "usbconf://server/app/start") described in the schema format for USB on the browser 31a of the tablet computer 3 (step S2). Then, the electronic conference device class driver 33 of the tablet computer 3 converts the request into a format for the Web server, such as "GET/app/start HTTP/1.0" (step S3). After that, the tablet computer 3 (transmission processor) transmits the converted request to the PC 2 in the communication manner of USB (step S4).

Upon receipt of the request, the kernel-mode virtual network driver 24 of the PC 2 converts the request into the IP format (i.e., attaches "destination:192.168.1.2" to the request) (step S5) and forwards the converted request to the user-mode network driver 27, which is the destination. The user-mode network driver 27 determines, from the "GET" method in the request, that the request is destined for the application 28 and therefore forwards the request to the application 28.

The application 28 receives the request and creates a response corresponding to the URI, i.e., "/app/start", of the requested data and outputs the created response (step S6, see <REQUEST AND RESPONSE> in FIG. 5) to the kernel-mode virtual network driver 24. If a response corresponding to "/app/start" is prepared beforehand, the application 28 is allowed to omit the step S6.

Upon receipt of a response from the application 28, the kernel-mode virtual network driver 24 converts the response into the schema format for USB (step S7).

Specifically, as illustrated in FIG. 6, the kernel-mode virtual network driver 24 (see FIG. 3) obtains "Content-Type" indicating the data format from the response, and transmits "Content-Type" to the rewrite object specifier 24c (step S11). The rewrite object specifier 24c determines whether "Content-Type" from the controller 24d is to be rewritten (step S12). In the example of FIG. 5, since "Content-Type" is "test/html", which means HTML data, the rewrite object specifier 24c determines that the response is to be rewritten (Yes route in step S12).

When the response is determined to be rewritten, the controller 24d transmits the character string (i.e., network address) of the response to the rewrite processor 24g (step S13). For example, the controller 24d extracts the character string of "http . . . " from the link tag "href" of the response or extracts a predetermined character string from the tag (e.g., "<li> . . . </li>" or "<a> . . . </a>") containing the link tag, and transmits the extracted character string to the rewrite processor 24g.

The rewrite processor 24g rewrites the network address sent from the controller 24d into the device address of the destination of the response by referring to the device address memory 24e (step S14). The controller 24d receives the result of process carried out by the rewrite processor 24g (step S15). The controller 24d transmits the result further to the USB communication processor 24a (step S16) and the response conversion by the kernel-mode virtual network driver 24 finishes (see step S7, and <REQUEST AND RESPONSE> in FIG. 5).

When the rewrite object specifier 24c determines that the "Content-Type" of the response is not to be rewritten in step S12 (No route in step S12), the kernel-mode virtual network driver 24 does not convert the response and the procedure moves to step S16.

Referring back to FIG. 5, after the kernel-mode virtual network driver 24 carries out the response conversion, the PC 2 (the USB driver 22) transmits the converted response to the tablet computer 3 in the communication manner of USB (step S8). Then the tablet computer 3 receives the response and the browser 31a of the tablet computer 3 carries out displaying processing based on the received response (step S9).

When the user selects a predetermined link (e.g., " . . . /overview") on the response that is displayed on the browser 31a, the browser 31a issues a request to the link. The tablet computer 3 repeats the procedural steps S1-S9.

The procedural steps S1-S9 are carried out between the PC 2 and each of the tablet computers 3-1 through 3-3, independently from one another. Accordingly, each user attending cooperation such as an electronic conference refers to the same screen of the PC 2 (Web server), such as a screen displaying presentation material of the current speaker, on the monitor of the tablet computer 3. One of the tablet computers 3 can carry out control over the PC 2, such as switching a screen (e.g., presentation material) to be displayed on the display/projector 4.

As the above, the cooperation assist system 1 achieves an electronic conference using multiple tablet computers 3 with the configuration that the respective tablet computers 3 refer to the screen of the PC 2 (Web server).

As the above, the schema extending function 31*b* on the tablet computer 3 adds a function of issuing a request containing a URL described in a schema format for USB on the browser 31*a*, which can issue a request containing a URL described in the schema format that the browser 31*a* previous has. In addition, the electronic conference device class driver 33 converts the request to the PC 2 into a format recognizable by the PC 2.

The kernel-mode virtual network driver 24 of the PC 2 converts a URL which is described in the schema format that the browser 31*a* previously has and which is contained in a response from the application 28 into a URL described in the schema format for USB.

As detailed above, at least one of the PC 2 and the tablet computer 3 makes it possible to display the response from the PC 2 on the tablet computer 3 through the access in communication manner (predetermined communication manner) compatible with the schema format of USB, which is different from the communication manner compatible with the schema format that the browser 31*a* previously has. Consequently, the above communication manner among the PC 2 and the tablet computers 3 easily attains cooperation using multiple tablet computers 3.

In detail, a communication manner via USB can be achieved by the configuration in which each tablet computer 3 transmits a request based on a URL described in the schema format for USB confirming to the communication manner in the schema format for USB to the PC 2 and receives a response including a URL described in the schema format for USB from the PC 2. This means that even in cases where the PC 2 is connected to Internet or company Intranet, the communication between the PC 2 and the tablet computer 3 via USB impose limitation on Internet access from the browser 31*a* unless an additional interface for communication between USB and Internet is installed in the PC 2. Accordingly, it is possible to reduce security risk, such as leaking the presentation material to the third party and leaking information by entering Intranet via the tablet computer 3. Consequently, cooperation using multiple tablet computers 3 can be securely carried out.

(1-5) Modification to the First Embodiment:

The cooperation assist system 1 of the first embodiment described as the above assumes the cable 1*a* disposed between the PC 2 and each tablet computer 3 is a USB cable, but the connection manner between the PC 2 and the tablet computer 3 is not limited to a USB cable. For example, the cable 1*a* may be replaced by wireless communication such as Bluetooth.

Figure 7:
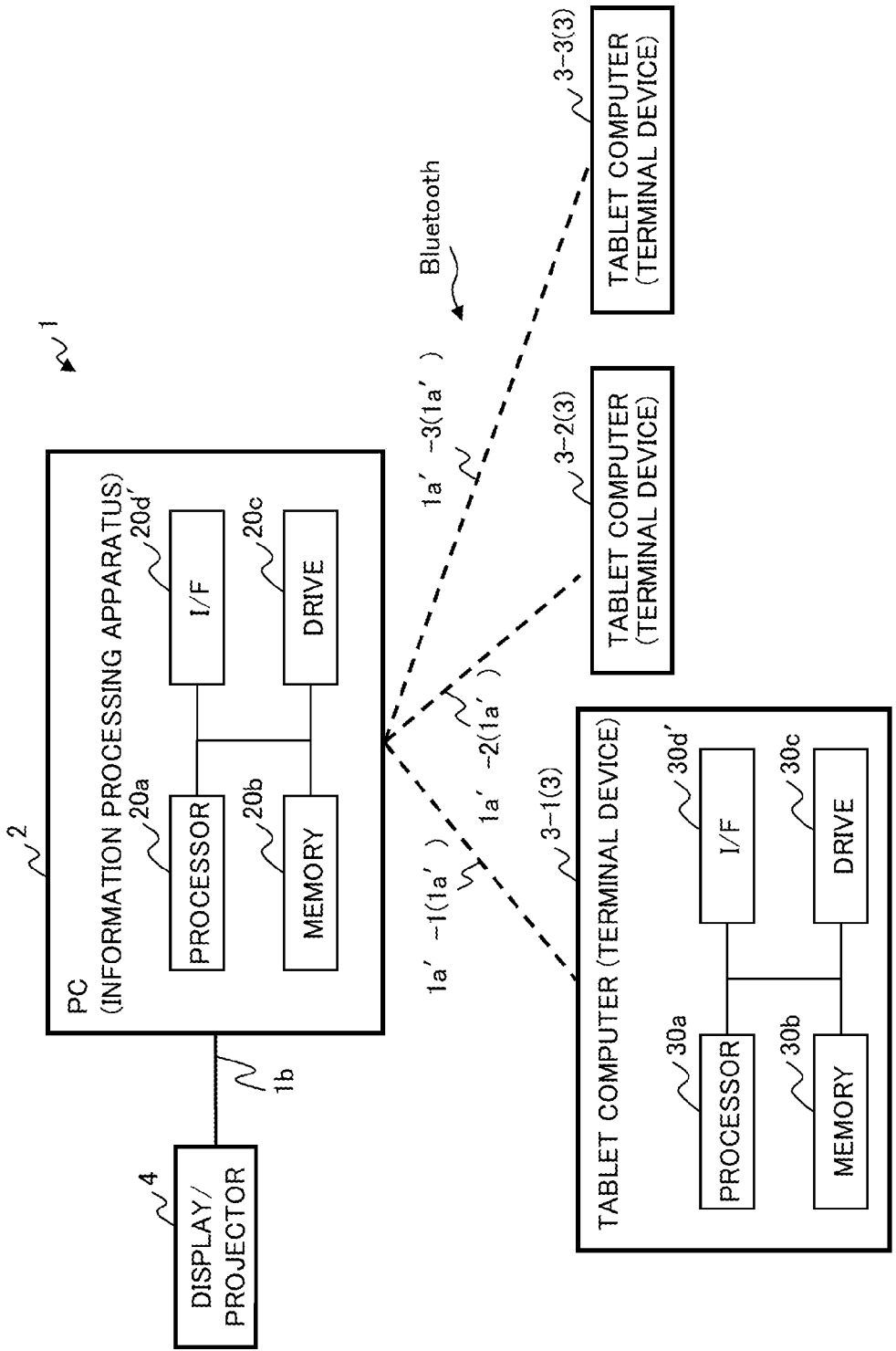
FIG. 7 is a diagram illustrating a modification of the configuration of a cooperative conference assist system of the first embodiment.
Figure 8:
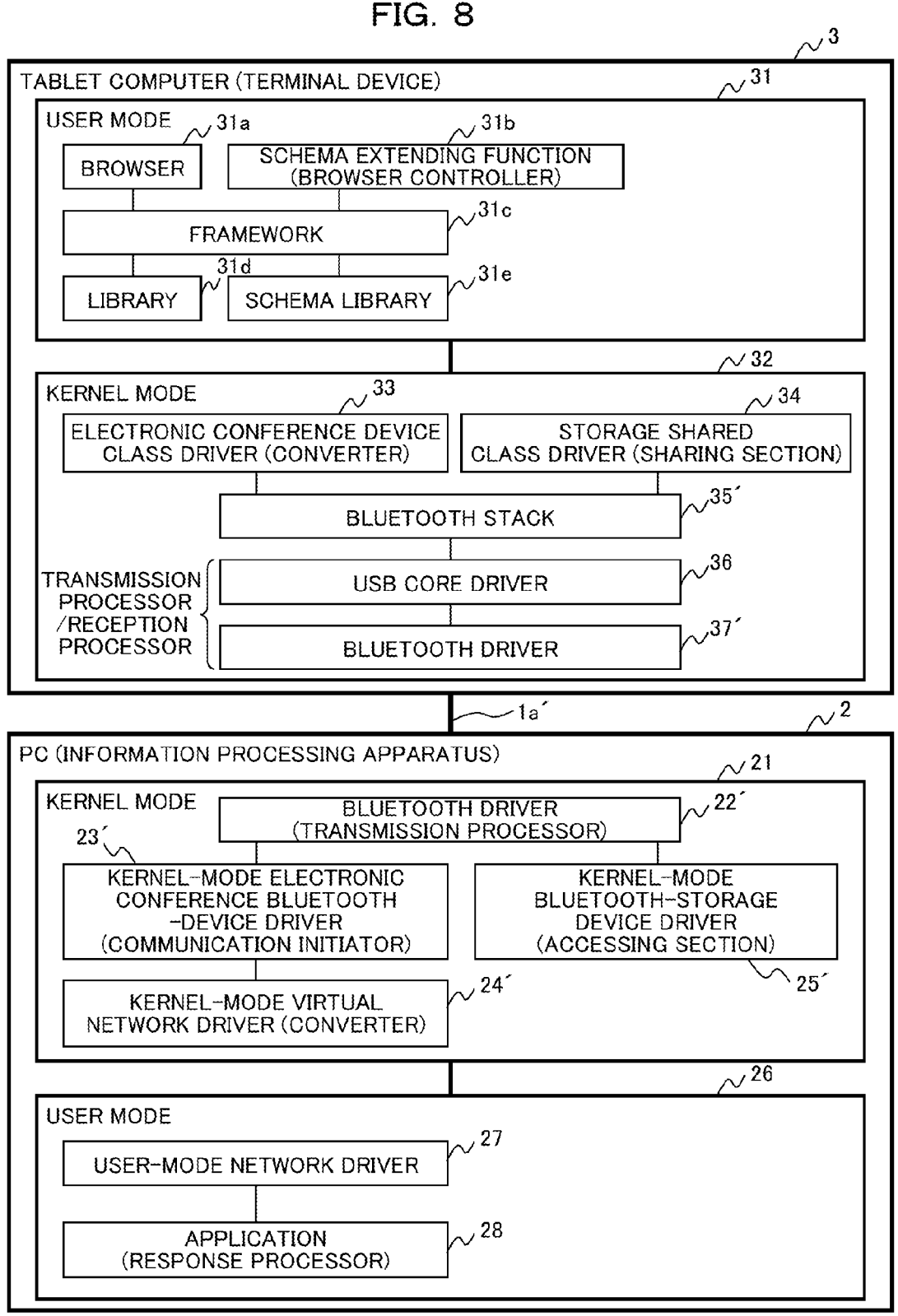
FIG. 8 is a diagram illustrating a modification of software configurations of a PC and a tablet computer of the first embodiment.
Figure 9:
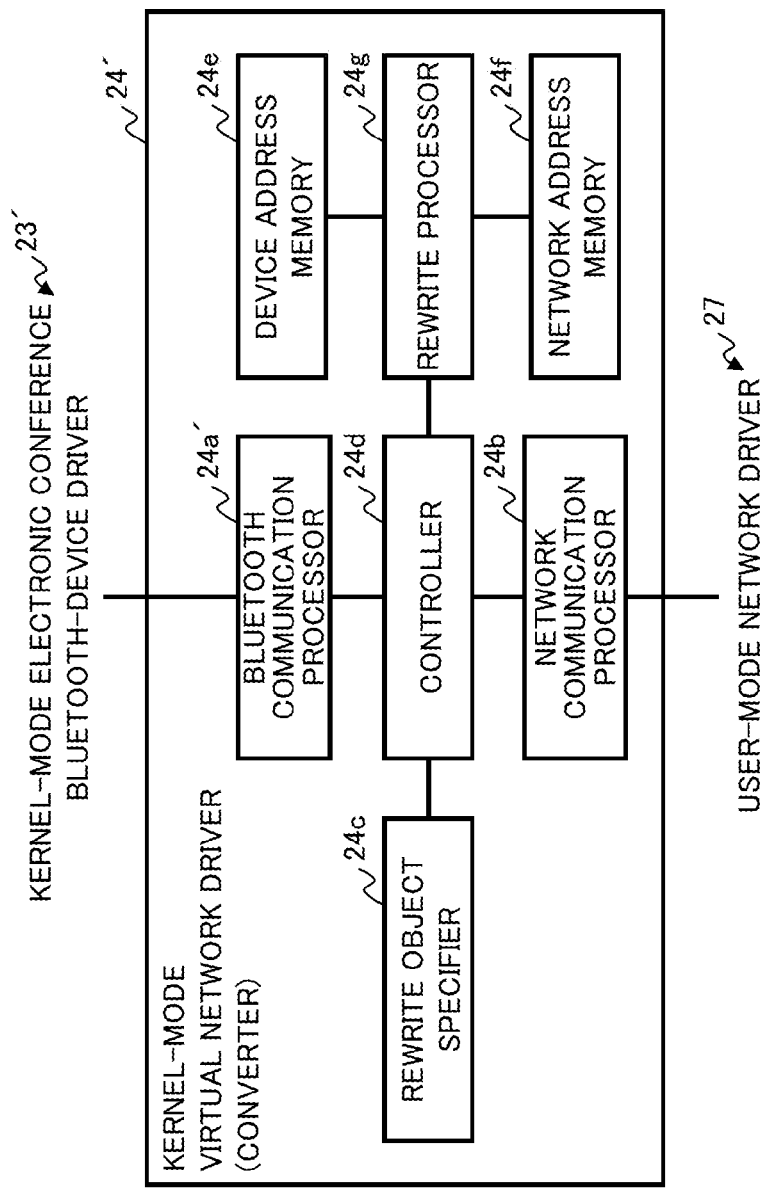
FIG. 9 is a block diagram illustrating a modification of a detailed configuration of a kernel-mode virtual network driver of FIG. 8.
Figure 10:
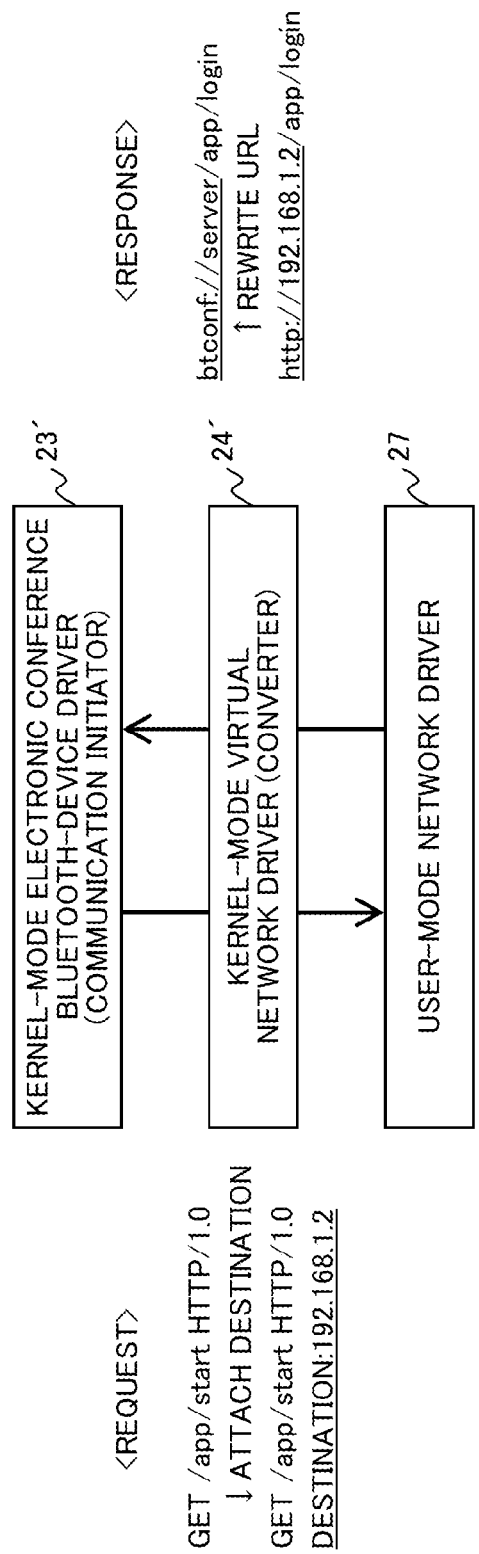
FIG. 10 is a diagram illustrating a modification of the operation of a kernel-mode virtual network driver of FIG. 8.
Figure 11:
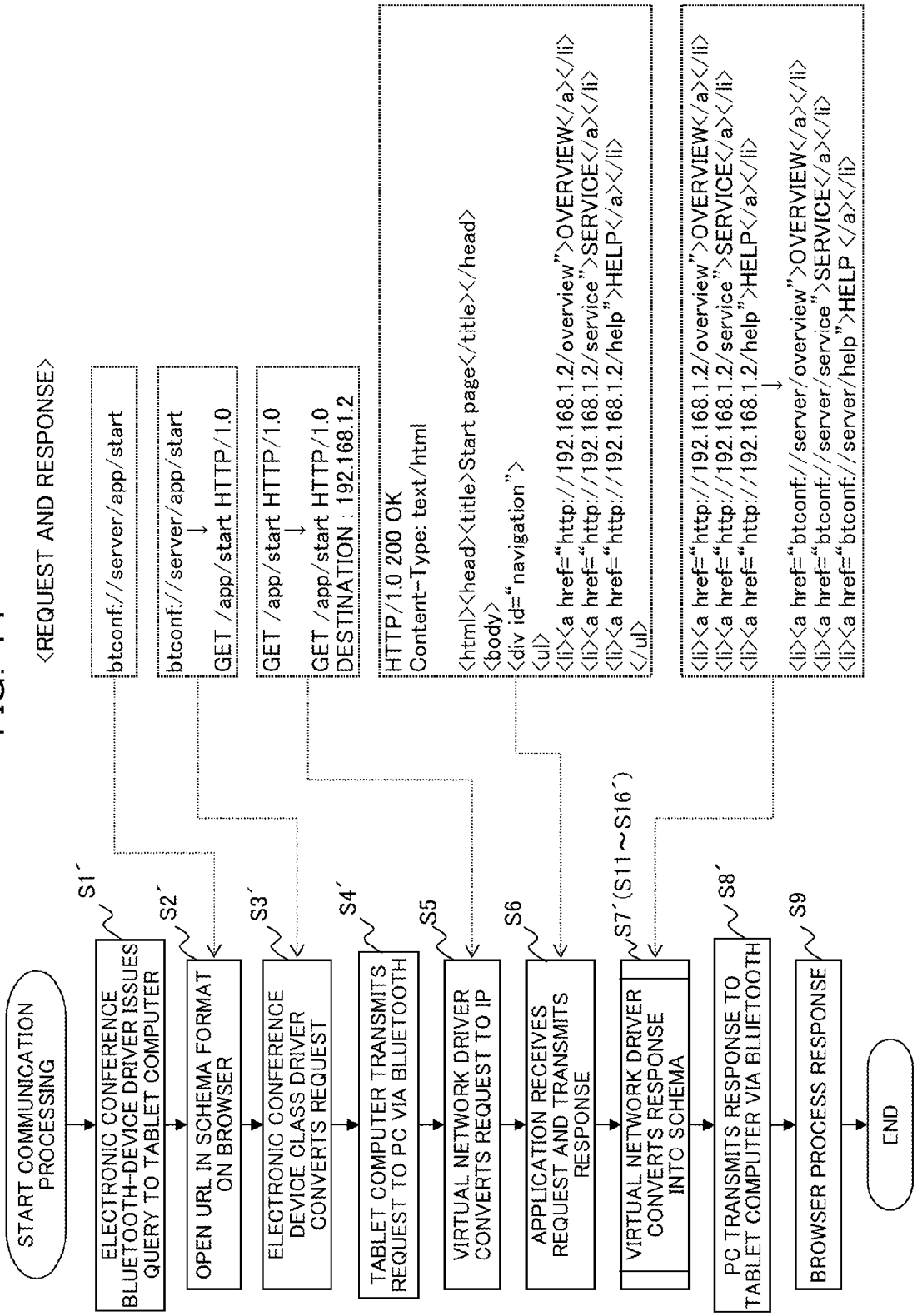
FIG. 11 is a flow diagram illustrating a modification of a succession of procedural steps of communication processing performed by a PC and a tablet computer of FIG. 8.
Figure 12:
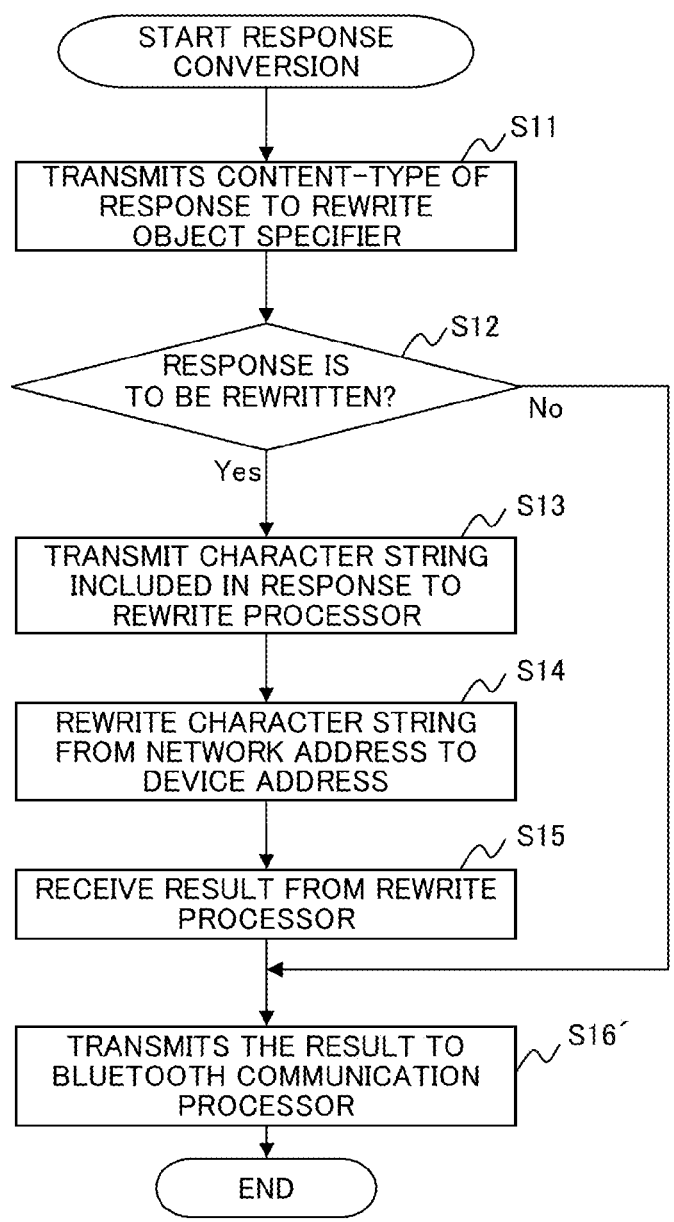
FIG. 12 is a flow diagram illustrating a modification of detailed procedural step of converting a response of a kernel-mode virtual network driver of FIG. 11.

FIG. 7 is a diagram illustrating an example of the configuration of the cooperation assist system 1 according to a modification of the first embodiment; FIG. 8 is a diagram illustrating an example of the software configuration of the PC 2 and the tablet computers 3 of this modification; FIG. 9 is a block diagram schematically illustrating an example of the detailed configuration of the kernel-mode virtual network driver 24 of FIG. 8 of this modification; FIG. 10 is a diagram illustrating an example of operation of the kernel-mode virtual network driver 24 of FIG. 8 of this modification; the FIG. 11 is a flow diagram illustrating an example of communication processing of the PC 2 and the tablet computer 3 of FIG. 8 of this modification; and FIG. 12 is a flow diagram illustrating an example of a succession of detailed procedural steps of response conversion by the kernel-mode virtual network driver 24 of FIG. 11 of this modification.

As illustrated in FIG. 7, the PC 2 and the respective tablet computers 3 of this modification communicate via wireless communication 1*a*'-1 through 1*a*'-3 conforming to Bluetooth. Hereinafter, when the wireless communication 1*a*'-1 to 1*a*'-3 are not discriminated from one another, the wireless communication 1*a*'-1 to 1*a*'-3 are each simply referred to as the wireless communication 1*a*'. The PC 2 and the tablet computers 3 include a I/F 20' and I/F 30*d*' for wireless communication via Bluetooth.

Like reference numbers in FIGS. 7 and 8 designate the similar parts and element described in FIGS. 1 and 2, so any repetitious description is omitted here.

As illustrated in FIG. 8, the kernel mode 32 of the tablet computer 3 provides functions of a Bluetooth stack 35' and a Bluetooth driver 37', which are different from the function illustrated in FIG. 2.

The Bluetooth stack 35' is a driver that provides the tablet computer 3 with a function of a Bluetooth mode, which corresponds to the USB accessory mode of the first embodiment and in which the PC 2 serves as the master of communication. The Bluetooth stack 35' is management software including a Bluetooth driver. The USB core driver 36 provides various functions, such as protocols, for the communication with the PC 2 via Bluetooth as expanded functions of USB. The Bluetooth driver 37' controls a non-illustrated Bluetooth controller included in tablet computer 3.

The USB core driver 36 and the Bluetooth driver 37' collectively function as a transmission processor that transmits a request converted by the electronic conference device class driver 33 to the PC 2 by the communication manner conforming to Bluetooth, and also collectively functions as a reception processor that receives a response from the PC 2 to the request, which response contains a URL described in schema format for Bluetooth, via the communication manner of Bluetooth.

A kernel-mode virtual network driver 24' rewrites a URL which is contained in a response from the Web server and which is described in a schema format that the browser 31*a* previously has into a schema format for Bluetooth. In this modification, the new schema format, which is schema format for Bluetooth, is represented by "btconf" and thereby, a URL described in the schema format for Bluetooth, that is a request, is "btconf://server/app/start".

For example, as depicted in the box <RESPONSE> in FIG. 10, the kernel-mode virtual network driver 24' rewrites the URL that begins with "http" included in the response from the Web server into a schema format for Bluetooth that begins with "btconf".

No further description will be made in relation to the configurations and operations of the remaining elements represented by reference numbers with a prime "''".

Namely, the elements represented by reference numbers with a primes, that is, the elements 22', 23', and 25' in FIG. 8, and the element 24*a*' in FIG. 9 are different from the corresponding elements of FIGS. 2 and 3 that adopts communication via USB only in the point of adopting a communication manner using Bluetooth, but are substantially the same in the remaining configuration as the corresponding elements of FIGS. 2 and 3, so repetitious description is omitted here. Similarly, the procedural steps represented by reference numbers with a prime, that is, the steps S1' to S4', S7', and S9' in FIG. 11 and the step S16' in FIG. 12 are different from the corresponding steps of FIGS. 5 and 6 that adopts communication via USB only in the point of adopting a communication manner using Bluetooth, but are substantially the same in the remaining operation as the corresponding steps of FIGS. 5 and 6, so repetitious description is omitted here.

The above configuration of this modification attains the same advantageous effects as the first embodiment.

Figure 13:
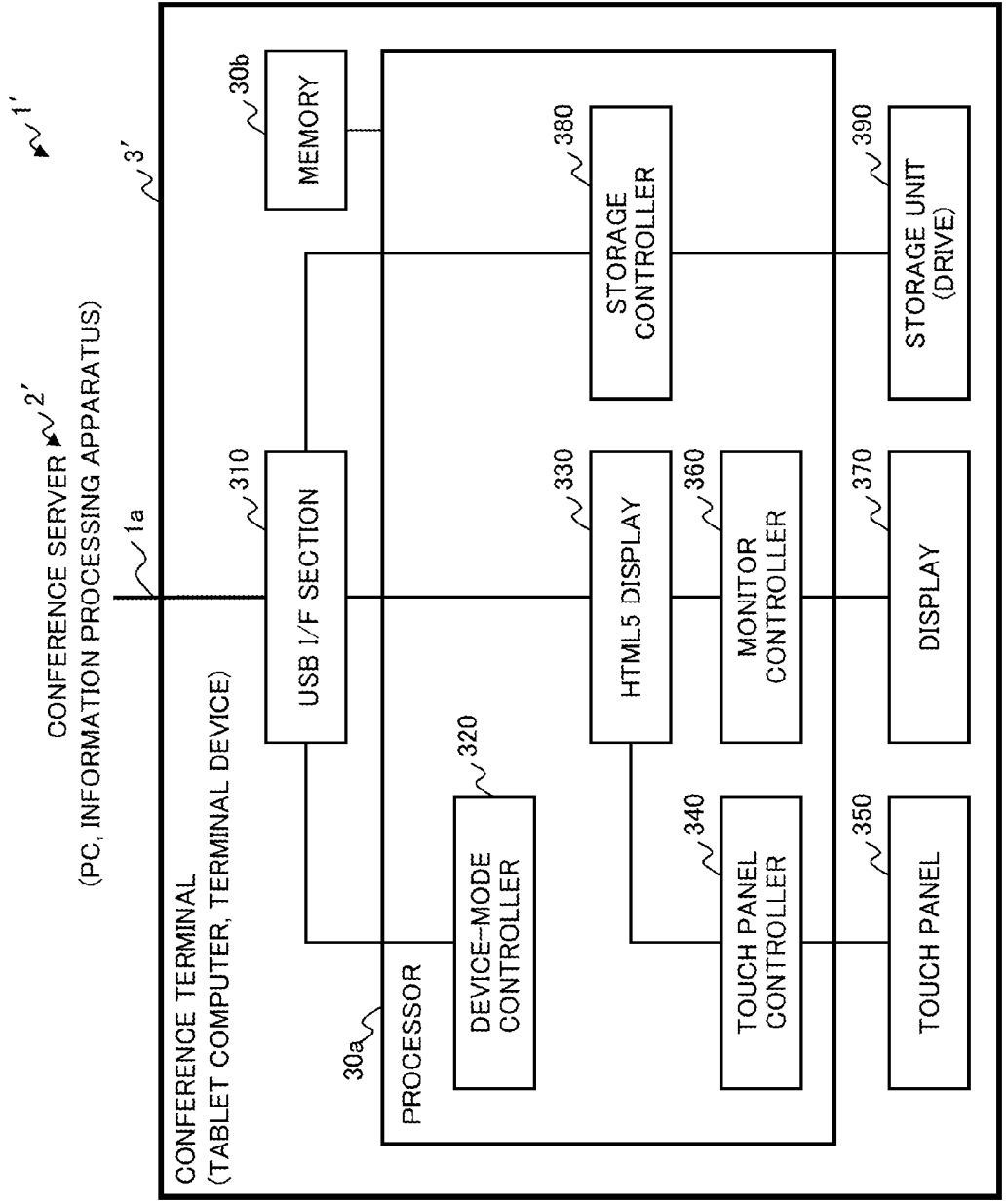
FIG. 13 is a diagram illustrating an example of a configuration of a conference terminal according to the second embodiment.

(2) Second Embodiment:

(2-1) Configuration of the Second Embodiment:

Next, description will now be made in relation to a cooperation assist system 1' according to a second embodiment with reference to FIGS. 13-22. The description here also assumes that the cooperation is an electronic conference. FIG. 13 is a diagram illustrating an example of a configuration of a conference terminal 3' of the second embodiment and FIG. 14 is a diagram illustrating an example of the configuration of the conference server 2'.

Figure 14:
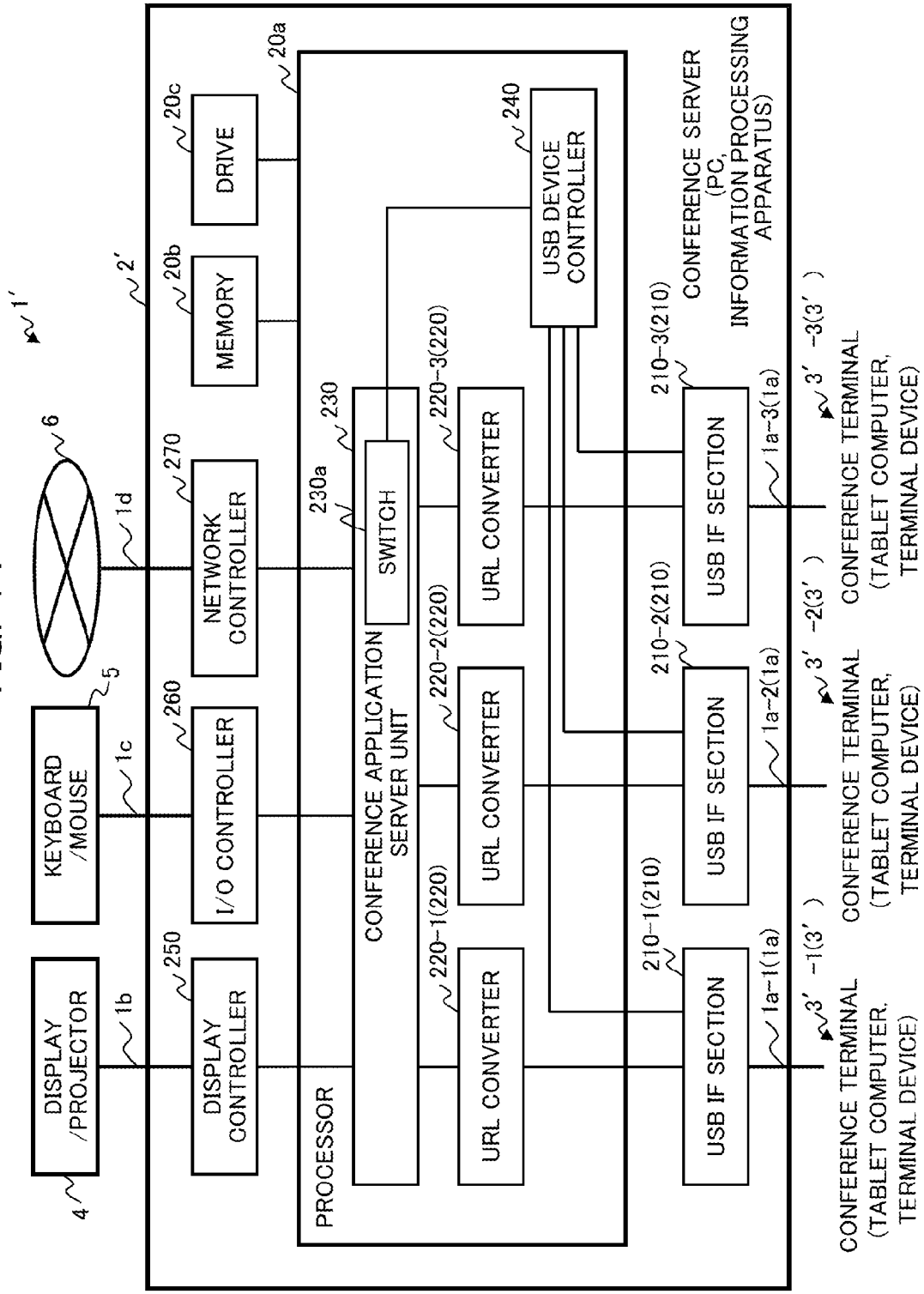
FIG. 14 is a diagram illustrating an example of the configuration of a conference server according to the second embodiment.

The conference terminal 3' of FIG. 13 has the configuration and the function substantially the same as those of the tablet computer 3 illustrated in FIGS. 1 and 2; and the conference server 2' of FIG. 14 has the configuration and the function substantially the same as those of the PC 2 illustrated in FIGS. 1 and 2. The conference terminal 3' and the conference server 2' illustrated in FIGS. 13 and 14 have additional hardware and unified functions of software to those of the tablet computer 3 and the PC 2 illustrated in FIGS. 1 and 2, respectively. The configurations of the conference terminal 3' and the conference server 2' will now be described.

First, the configuration of the conference terminal 3' will now be detailed.

As illustrated in FIG. 13, the conference terminal (tablet computer, terminal device) 3' includes hardware elements of a processor 30a, a memory 30b, a USB I/F section 310, a touch panel 350, a display 370, and a storage unit 390.

The processor 30a and the memory 30b have the same configurations as those included in the tablet computer 3 of FIG. 1.

The USB I/F section 310 is an interface that communicates with the conference server 2' via a cable 1a, such as a USB cable. The USB I/F section 310 is part of the I/F 30d depicted in FIG. 1 and is controlled by the USB core driver 36 and the host control driver 37 depicted in FIG. 2.

The touch panel 350 is an input device that passes information and instructions input from the user by touching the panel to the processor 30a, and the display 370 is an outputting device that displays information output from the processor 30a. The second embodiment assumes that the touch panel 350 and the display 370 are configured to be an integrated input/output device.

The storage unit 390 is an example of the drive 30c depicted in FIG. 1. An example of the storage unit 390 is a non-volatile memory such as an SSD or a flash memory.

As illustrated in FIG. 13, the processor 30a has the functions of a device-mode controller 320, an HTML5 display 330, a touch panel controller 340, a monitor controller 360, and a storage controller 380.

The device-mode controller 320 controls USB I/F section 310 to switch between the USB-device mode and the USB-accessory mode and is achieved by the USB accessory mode driver 35 of FIG. 2. The device-mode controller 320 of the second embodiment carries out control such that, when the conference terminal 3' is holding an electronic conference in cooperation with the conference server 2', the USB I/F section 310 operates as the USB accessory mode.

In the course of an electronic conference, the HTML5 display 330 carries out various processes such as comprehending the response which is received via the USB I/F section 310 and which is described in, for example, the HTML5 format and dealing with requests and responses between the conference terminal 3' and the conference server 2'. The HTML5 display 330 is achieved by at least part of the functions in the user mode of the electronic conference device class driver 33, the browser 31a, the schema extending function 31b, the library 31d, the schema library 31e. The functions of the browser 31a and schema extending function 31b may be provided by another application (not illustrated) executed by the processor 30a.

The touch panel controller 340 and the monitor controller 360, which are however omitted in FIG. 2, are drivers that control the touch panel 350 and the display 370, respectively. The touch panel controller 340 outputs information and operation that the user inputs via the touch panel 350 to the HTML5 display 330, and the monitor controller 360 controls the display 370 to display data thereon (e.g., the screen of the browser 31a) output from the HTML5 display 330.

The storage controller 380 shares at least part of the storage unit 390 (drive 30c) with the conference server 2' in such a manner that the conference server 2' browses the shared part of the storage unit 390, and is achieved by the storage shared class driver 34.

Next, description will now be made in relation to the configuration of the conference server 2'.

As illustrated in FIG. 14, the conference server (PC, information processing apparatus) 2' has a hardware configuration of a processor 20a, a memory 20b, a display controller 250, an Input/Output (I/O) controller 260, and a network controller 270.

The processor 20a, the memory 20b, and the driver 20c have the same configurations as those included in the PC 2 depicted in FIG. 1.

The display controller 250 controls displaying of the display/projector 4 via any kind of AV cable such as an HDMI cable. The I/O controller 260 controls an input device such as a keyboard/mouse 5 connected to the I/O controller 260 via a cable 1c. The network controller 270 controls connection to, for example, Internet via a cable 1d such as a LAN cable. The display controller 250, the I/O controller 260, and the network controller 270 are each part of the I/F 20d of FIG. 1 and are controlled by respective drivers.

The USB I/F sections 210-1 through 210-3 (hereinafter, when the USB I/F sections 210-1 to 210-3 are not discriminated from one another, the USB I/F sections 210-1 to 210-3 are each simply referred to as the USB I/F section 210) are interfaces to communicate with the conference terminals 3' via the cables 1a such as USB cables. The USB I/F sections 210 are part of the I/F 20d of FIG. 1 and are controlled by the USB driver 22 of FIG. 2.

As illustrated in FIG. 14, the processor 20a has functions of URL converters 220-1 through 220-3 (hereinafter, when the URL converters 220-1 to 220-3 are not discriminated from one another, the URL converters 220-1 to 220-3 are each simply referred to as the URL converter 220), a conference application server unit 230, and a USB device controller 240.

Each URL converter 220 attaches a destination to a request or a response or rewrites the URL of a request or a response, and is achieved by the kernel-mode virtual network driver 24 of FIG. 2.

The conference application server unit 230 functions as a Web server of the electronic conference and is achieved by the application 28 of FIG. 2. The conference application server unit 230 outputs responses to request from the respective URL converters 220.

The conference application server unit 230 of the second embodiment has a function of the switch 230a that outputs an arbitrary response among responses (in the form of HTML data) generated for each conference terminal 3' to the display controller 250. A response output to the display controller 250 is displayed on the display/projector 4.

An instruction to the switch 230a that determines a response to be output is input from the keyboard/mouse 5 through the I/O controller 260 or from each conference terminal 3' through the corresponding USB I/F section 210 and the USB device controller 240.

The conference application server unit 230 preferably stores a response that the conference application server unit 230 outputs to each conference terminal 3', i.e., the data (HTML data) to be displayed on the conference terminals 3', in the storage (e.g., the memory 20b or the drive 20c).

The USB device controller 240 controls the USB devices participating in the electronic conference, that is, carries out various controls on each conference terminal 3', and is achieved by the kernel-mode electronic conference USB-device driver 23 of FIG. 2. As one example of the control, the USB device controller 240 regularly issues a query of initiation of communication to each conference terminal 3'.

The USB device controller 240 of the second embodiment transmits HTML data that the conference application server unit 230 stored in the storage to the conference terminal 3' of the facilitator of the electronic conference. The USB device controller 240 recognizes the conference terminal 3' of the facilitator beforehand. For example, the recognition is carried out by logging-in by user authorization when the communication between the conference server 2' and the conference terminal 3' is being established. Specifically, the facilitator makes the USB device controller 240 recognizes that he/she (i.e., the own conference terminal 3') is the facilitator by, for example, logging-in using a facilitator user account or registering that he/she is the facilitator after the logging in.

Furthermore, the conference terminal 3' of the facilitator assigns HTML data that is to be output to the display controller 250, the USB device controller 240 instructs the conference application server unit 230 (the switch 230a) to output the HTML data to the display controller 250. For example, when the conference terminal 3' of the facilitator assigns the HTML data displayed on the conference terminal 3' of the speaker, the USB device controller 240 notifies the switch 230a of information to specify the conference terminal 3' of the speaker. The switch 230a outputs, to the display controller 250, data of a response output from the conference application server unit 230 to the conference terminal 3' specified by the information notified from the conference terminal 3'. The switch 230a outputs data of a response to the display controller 250 each time the response destined for the conference terminal 3' of the speaker is output until the conference terminal 3' of the facilitator notifies the switch 230a of stopping of output to the display controller 250 or information that specifies another conference terminal 3'. This makes the cooperation assist system 1' possible the display/projector 4 to display the same screen as the screen on the conference terminal 3' of the speaker following the operation of the speaker.

Upon receipt of a request to obtain the same data as the response (HTML data) destined for a predetermined conference terminal 3' in the conference application server unit 230 from another conference terminal 3', the USB device controller 240 instructs the switch 230a to output the HTML data to be output to the predetermined conference terminal 3' also to the conference terminal 3' that issued the request. Also in this case, the switch 230a outputs data of the same response to the conference terminal 3' that issued the request each time the response destined for the predetermined conference terminal 3' is output until the conference terminal 3' that issued the request notifies the switch 230a of stopping of the request to obtain the same data or issues a request to obtain the data of a response destined for another conference terminal 3'. This makes the cooperation assist system 1' possible the display/projector 4 to display the same screen as the screen on the conference terminal 3' of the speaker on the display of another conference terminal 3' that wishes to display the same screen, following the operation of the speaker.

(2-2) Browsing Presentation Materials:

Here, description will now be made in relation to a manner of browsing presentation materials on a conference terminal 3' of the second embodiment. FIGS. 15-21 are examples of screen displaying on the I/O device of the conference terminal 3' in processing related to an electronic conference of the second embodiment.

In the second embodiment, an electronic conference proceed on the browsers 31a of the respective conference terminals 3' on the basis of HTML data provided by the application 28 of the conference server 2'.

Figure 15:
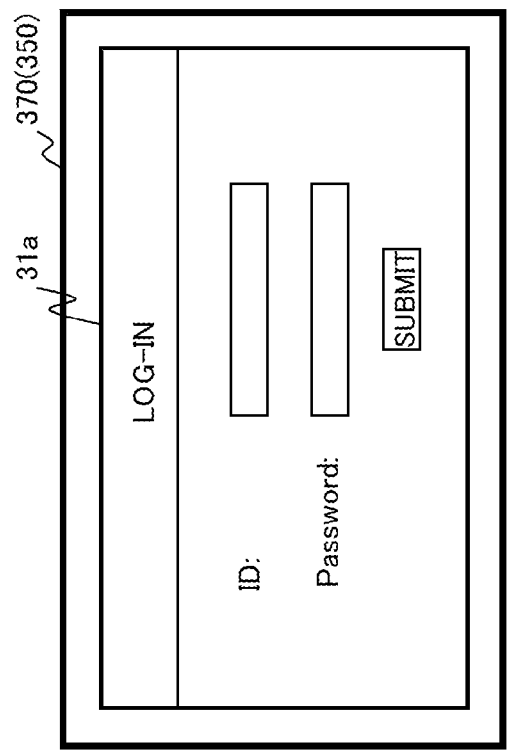
FIG. 15 is a diagram illustrating an example of displaying on a monitor of the I/O device of a conference terminal in electronic conference processing of the second embodiment.

As illustrated in FIG. 15, a request that a conference terminal 3' transmits to the conference server 2' at the start of an electric conference can be a logging-in screen on which a user to be participated in the electronic conference is authenticated. The logging-in procedure and the subsequent transition of the screen are carried out in the same manner as described above along FIG. 5. After all the participants of the electronic conference complete logging-in, connection of all the participants in the conference server 2' is completed.

In the logging-in selection screen, each participant inputs the ID and the password, depresses "submit", and consequently logs in the electric conference. After the logging in, the conference server 2' outputs a selection screen of the browsing mode as depicted in FIG. 16.

Figure 17:
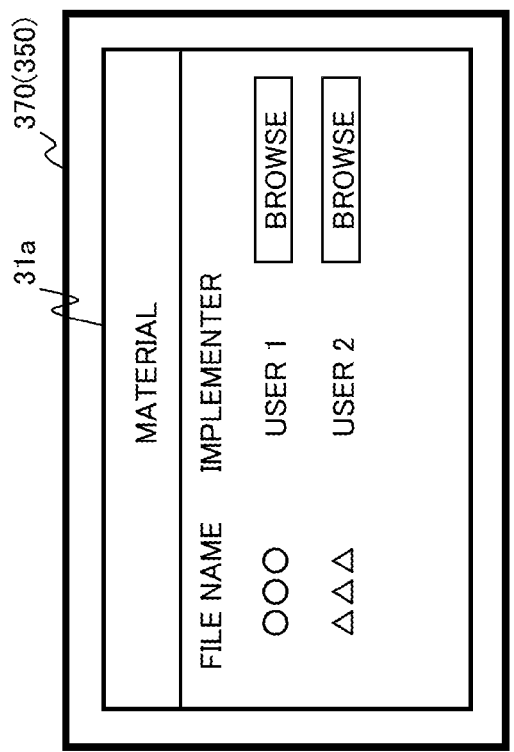
FIG. 17 is a diagram illustrating an example of displaying on a monitor of the I/O device of a conference terminal in electronic conference processing of the second embodiment.

On the selection screen of the browsing mode, each participant selects one from "Participant", "Speaker", and "Facilitator", which are to be detailed below, and depresses "submit", so that selection of the browsing mode of the participant is completed. After the selecting the browsing mode, the conference server 2' outputs a list of files stored in the shared storages of the respective conference terminals 3', as depicted in FIG. 17. The list is obtained by the kernel-mode USB-storage device driver 25 retrieving the shared storages of the respective conference terminals 3'. Accordingly, speakers ("user 1" and "user 2" in the example of FIG. 17) stores presentation material in the shared storage of the own conference terminals 3' beforehand, so that the other participants can referred to the presentation material.

When a conference terminal 3' selects the item "Browse" of a piece of material on the FIG. 17, the kernel-mode USB-storage device driver 25 of the conference server 2' carries out control in the above manner such that the conference terminals 3' can refer to the material (shared file) of the referring destination selected on the conference terminal 3'. In other words, the kernel-mode USB-storage device driver 25 in the conference server 2' regenerates the material and carries out control such that the browser 31*a* of each conference terminal 3' displays the material thereon.

Figure 16:
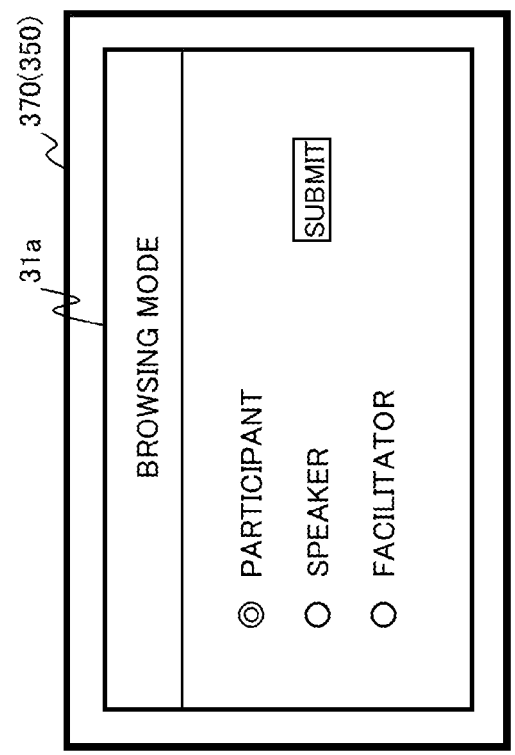
FIG. 16 is a diagram illustrating an example of displaying on a monitor of the I/O device of a conference terminal in electronic conference processing of the second embodiment.

When the item "Browse" is selected by the conference terminal 3', the material is displayed on the browser 31*a* in the browsing mode selected on the screen of FIG. 16.

Figure 18:
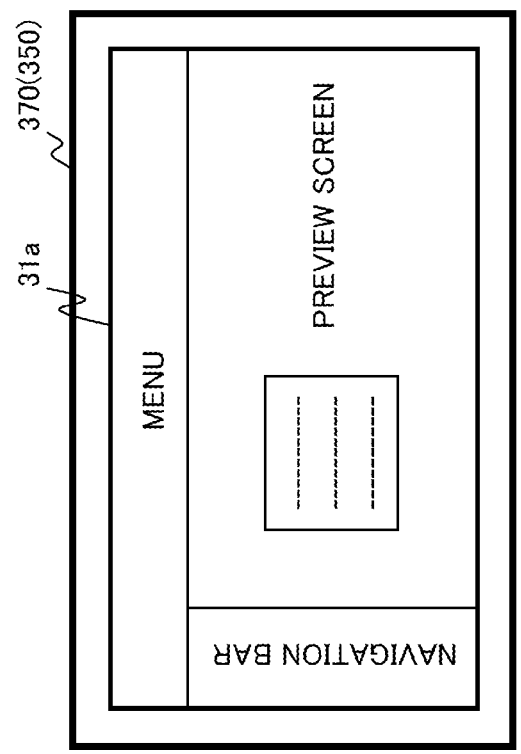
FIG. 18 is a diagram illustrating an example of displaying on a monitor of the I/O device of a conference terminal in electronic conference processing of the second embodiment.
Figure 19:
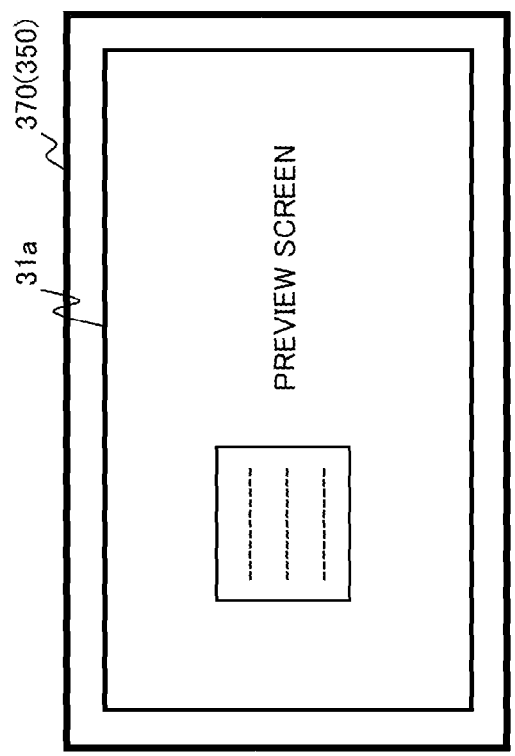
FIG. 19 is a diagram illustrating an example of displaying on a monitor of the I/O device of a conference terminal in electronic conference processing of the second embodiment.
Figure 20:
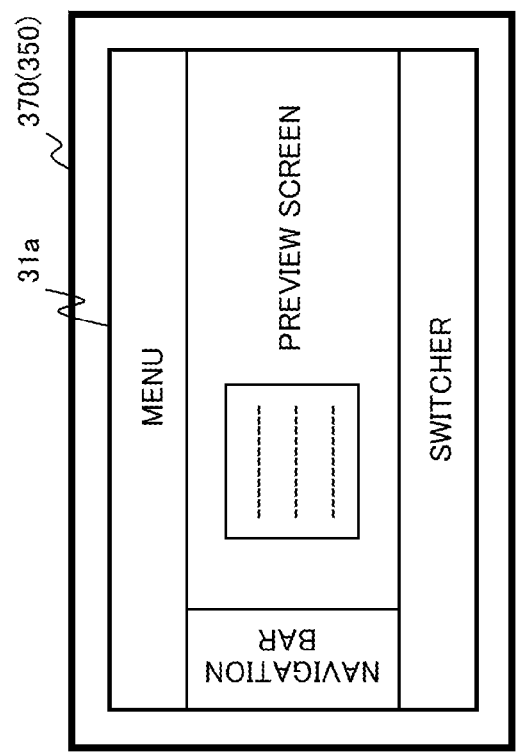
FIG. 20 is a diagram illustrating an example of displaying on a monitor of the I/O device of a conference terminal in electronic conference processing of the second embodiment.

Here, the browsing mode is a mode of displaying the presentation material depending on the role of the user of the conference terminal 3' in the electronic conference. As illustrated in FIGS. 18-20, examples of the browsing mode are a participant (general participant) mode, a speaker mode, and a facilitator mode.

The participant mode allows a general participant in the electronic conference to browse the material. As depicted in FIG. 18, the screen on the browser 31*a* in the participant mode has three items of "menu", "navigation bar", and "preview screen". A participant is allowed to open, preview, and edit the presentation material in the participant mode.

The speaker mode allows the current speaker in the electronic conference to browse and manipulate the material. As depicted in FIG. 19, the speaker mode is capable of carry out a slideshow in which a preview of the presentation material is displayed on the entire screen of the browser 31*a*. The browsing mode may be configured to switch to the speaker mode on the item of "menu" or "navigation screen" in the participant and facilitator modes.

The facilitator mode allows the facilitator of the electronic conference to manage the progress of the electronic conference. As depicted in FIG. 20, the screen in the facilitator mode has three items of "menu", "navigation bar", and "preview screen" the same as the screen in the participant mode. Accordingly, the facilitator is allowed to open, preview, and edit the presentation material also in the facilitator mode.

As depicted in FIG. 20, the screen in the facilitator mode additionally has the item of "switcher", which instructs the switch 230*a* of the conference server 2' to switch a screen to be displayed on the display/projector 4. Alternatively, the item of "switcher" may be displayed on an independent screen from the remaining screen on the browser 31*a* or may be achieved by another application except the browser 31*a*.

Figure 21:
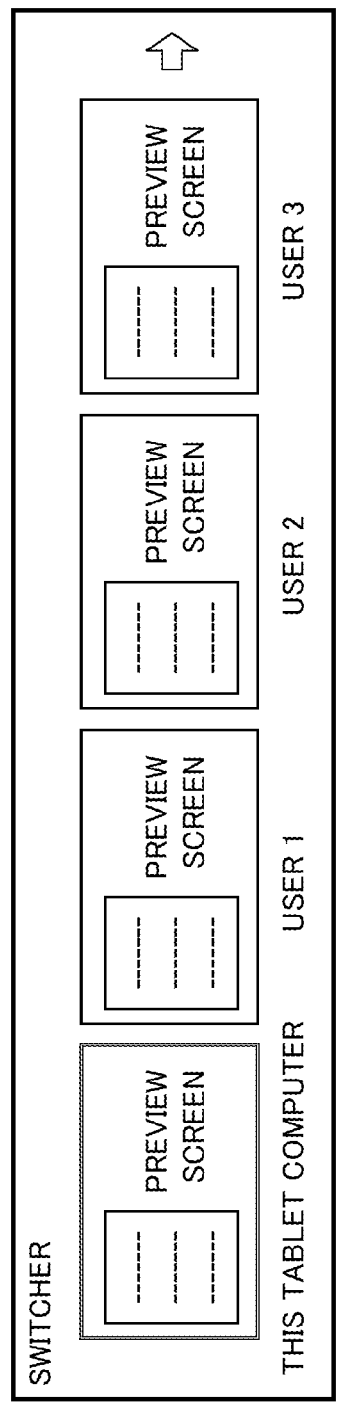
FIG. 21 is a diagram illustrating an example of displaying on a monitor of the I/O device of a conference terminal in electronic conference processing of the second embodiment.

The facilitator operates the item "switcher" and thereby, as depicted in FIG. 21, instructs the PC 2 (the switch 230*a*) to switch the screen to be displayed on the display/projector 4 to the screen of any conference terminal 3'.

As described above, each conference terminal 3' browses the presentation material (i.e., shared file) that the Web server obtains from the shared storage of a conference terminal 3' on the browser 31*a*. The browsing manner in the speaker mode of FIG. 19 is the same as the above. Specifically, the speaker browses the material stored in the shared storage in the own conference terminal 3' of the speaker on the browser 31*a* on the basis of the response obtained from the PC 2.

The conference terminal 3' can edit the conference material storing the shared storage thereof or other operation on the conference terminal 3' during the electronic conference. Besides, the each conference terminal 3' is capable of switching the screen on the "preview screen" to the screen the same as the screen of a predetermined (e.g., speaker's) conference terminal 3' through operating the item of "menu" or "navigation bar" of FIGS. 18 and 20. Namely, as described above, each conference terminal 3' is capable of issuing a request to obtain the same data as the HTML data displayed on a predetermined conference terminal 3' to the PC 2 (i.e., USB device controller 240). Thereby, each conference terminal 3' can receive the same HTML data as the HTML data displayed on the conference terminal 3' of, for example, the speaker from the switch 230*a*, and display the received HTML data thereon.

Consequently, the participants except for the speaker can display the screen (HTML data) the same as that displayed on the conference terminal 3' of the speaker. This allows the conference terminals 3' of the participants except for the speaker to display the same screen as that of the speaker on the browsers 31*a*, following the speaker's operation of the material, such as forwarding the pages of the material.

Alternatively, at least one of the functions of selecting the browsing mode or displaying the list of the material depicted in FIGS. 16 and 17 may be included in the function of the item "menu" or the "navigation bar" of the FIGS. 18 and 20.

Figure 22:
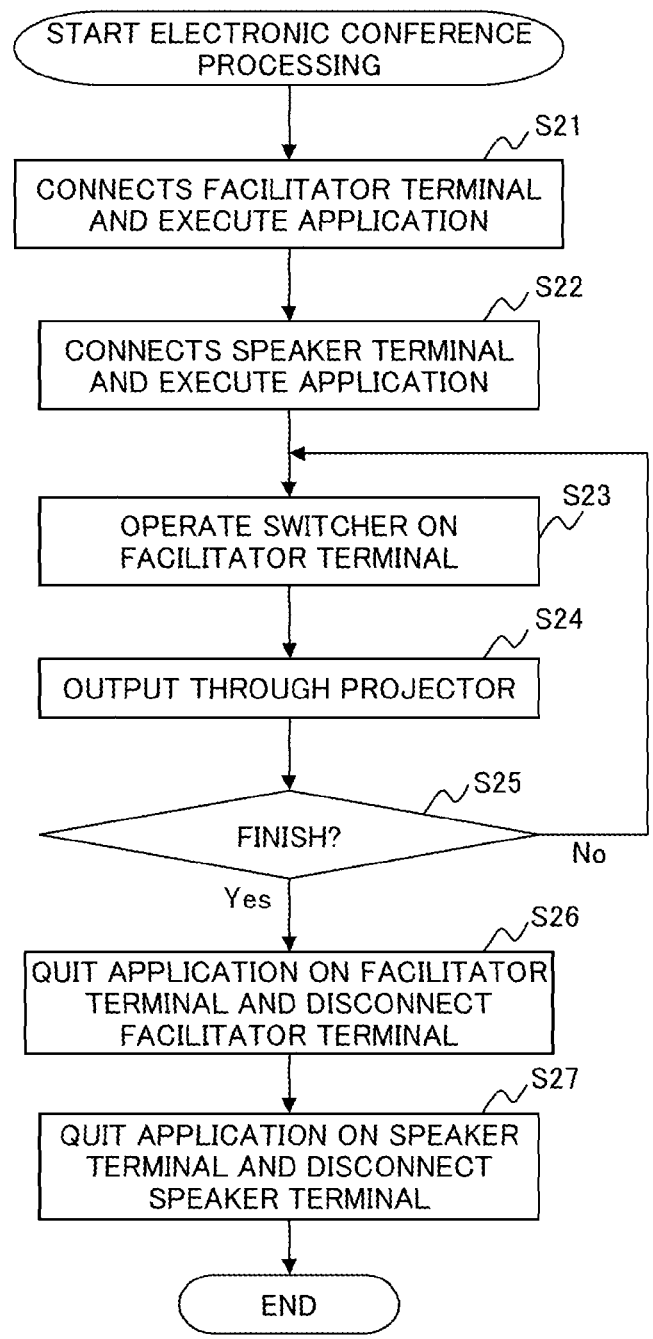
FIG. 22 is a flow diagram illustrating an example of a succession of procedural steps of electronic conference of the second embodiment.

(2-3) Example of Operation of the Second Embodiment:

Next, description will now be made in relation to an example of operation of the conference server 2' and the conference terminals 3' that have the above configurations with reference to FIG. 22. FIG. 22 is a flow diagram describing an example of operation of an electric conference according to the second embodiment.

The description here assumes that a speaker of the electronic conference has prepared the presentation material (files) on the conference terminal 3' beforehand or has copied the presentation material from another PC to the conference terminal 3' in advance. The conference server 2', the conference terminals 3', and the display/projector 4 are assumed to be already powered on.

As illustrated in FIG. 22, the conference terminal 3' of the facilitator is connected to the conference server 2' via the cable 1*a* such as a USB cable, and executes an application (i.e., the browser 31*a*) that initiates the communication processing (step S21). Next, the remaining conference terminals 3' of the participants and speaker(s) are connected to the conference server 2' via cables 1*a* such as USB cables and execute respective applications (i.e., the browsers 31*a*) that initiate the communication processing (step S22). Thereby, all the conference terminals 3' participate in the electronic conference can make accesses to the conference server 2' in the communication manner via USB, so that all the participants (including the facilitator and the speaker(s)) completes establishment of connection to the conference server 2'.

The second embodiment assumes that, in the steps S21 and S22, each conference terminal 3' and the conference server 2' communicates with each other via the screens (HTML data) depicted in FIGS. 15-17, and the screens (i.e., the material of the speaker) of FIGs. 18-20 are displayed on the browser 31*a* of each conference terminal 3'.

Next, the facilitator operates "switcher" (see FIG. 21) according to the progress of the electronic conference and instructs the conference server 2' to switch the screen of the speaker to be displayed on the display/projector 4 (step S23). Responsively, the switch 230*a* of the conference server 2' outputs the HTML data assigned by the "switcher" to the display controller 250, which then outputs the HTML data to the display/projector 4 (step S24).

The speaker displays the slideshow in the speaker mode on the browser 31*a* of the conference terminal 3', and carries out the presentation through various operations, such as turning pages of the materials using, for example, the touch panel 350 of the conference terminal 3' or a laser pointer having a function of page forwarding. At that time, the display/projector 4 displays thereon HTML data, following the operation, such as page forwarding, on the conference terminal 3' of the speaker, i.e., following the response output from the Web server in response to the operation, the operation being reflected in the HTML data being displayed.

When the presentation by the speaker finishes, the conference terminal 3' of the facilitator or the conference server 2' determines the electronic conference is to finish (step S25). If the electronic conference continues (No route in step S25), the procedure moves to step S23. At that time, the conference terminal 3' of the facilitator switches the screen by the item "switcher".

On the other hand, when the electronic conference is to finish (Yes route in step S25), the conference terminal 3' of the facilitator quits the browser 31a and breaks the connection via the cable 1a (step S26). The conference terminals 3' of the speaker and the participants also quit the browsers 31a thereon and break the connections via the cables 1a (step S27). Thereby, the communication manner using USB between the conference terminal 3' participating in the electronic conference and the conference server 2' finishes and consequently the electronic conference finishes.

As the above, the second embodiment guarantees the same effects as the first embodiment.

Additionally, the second embodiment allows each conference terminal 3' to display data from the Web server in the conference server 2' on the corresponding browser 31a through the access in the communication manner via USB.

Since each conference terminal 3' functions in the USB accessory mode, the conference server 2' can make an access to material (shared file) that the conference terminal 3' retains via a USB cable. During the access, the conference terminal 3' operates, in the USB accessory mode, on the shared file being accessed by the conference server 2', the conference terminal 3' can also access the shared file differently from when operating in the USB device mode.

Since each conference terminal 3' communicates with the conference server 2' via USB connection, not via LAN connection, the conference terminal 3', if operating under the control of Android OS, can escape from inconvenience of not allowed to connected to an ad-hoc network, i.e., to the conference server 2'.

Furthermore, in the second embodiment, each conference terminal 3' communicates with the conference server 2' in the USB accessory mode.

Here, if the conference terminal 3' in the USB host mode intends to establish communication with the conference server 2' using USB, the cooperation assist system 1' is equipped with a USB-to-USB bridge (see FIG. 24) that connects hosts to each other through USB so that the conference server 2' is connected to the conference terminal 3'. Each conference terminal 3' has a dedicated application for detecting a server, connecting the conference terminal 3' itself to the server, recognizing and displaying a client and a user, selecting and uploading files, displaying presentation material, and manipulating files.

On the other hand, the second embodiment, which achieves communication between the conference server 2' and each conference terminal 3' in the USB accessory mode, can omit the USB-to-USB bridge of the conference server 2'. The above dedicated application can be separated with the respective functions such as the HTML5 display 330 and the storage controller 380 of FIG. 13, which further simplifies the hardware configuration and the software configuration. Thereby, it is possible to suppress an increase in introduction cost of the cooperation assist system 1', so that an electronic conference can be held with ease.

According to the second embodiment, an electronic conference can be held with ease using equipment already existed only by connecting each conference terminal 3' and each conference server 2' via USB and add a simple application.

Here, the related technique described as the above (e.g., Patent Literature 1) executes an application of screen mirroring, so that data to be forwarded is motion picture (of high resolution) and voice, which has a size of about 2.5 MB/s and needs a communication speed as high as 20 Mbps. In contrast, among the conference terminals 3' and the conference server 2' of the second embodiment, presentation data is reproduced on the conference server 2' and is controlled by a conference terminal 3' to execute the presentation. The presentation data has a size of about 10 MB or less and needs the communication speed of about 500 Kbps.

USB 2.0 allows forwarding of the communication type (native) at the speed of 60 MB/s at the highest and forwarding of the storage type (SSD/HDD) at the speed of 1 MB/s at the highest when random access is carried out. The above related technique simultaneously carries out writing at 2.5 MB/s and reading at 2.5 MB/s in the direction from the PC to the small box. Assuming that the small box is a USB storage, the forwarding speed of 1 MB/s when random access as described above may make an electronic conference impossible. In contrast, the second embodiment achieves the difference data to be displayed on each conference terminal 3' is forwarded from the conference server 2' using a broadband of the native forwarding of USB (60 MB/s at the highest). Therefore, considering the performance of USB communication, it is sufficient to achieve the electronic conference according to the second embodiment. In the second embodiment, operation instructions are issued from a conference terminal 3' to the conference server 2' (this communication can use a narrow band).

As described above, since the cooperation assist system 1' of the second embodiment accomplishes screen description based on HTML5, which is lighter than screen mirroring, through USB communication, cooperation such as an electronic conference can be achieved with more inexpensive hardware and communication function.

As described above, since each conference terminal 3' is connected to the conference server 2' in the USB accessory mode, master constraint causes the conference server 2' to be the origin of the communication. This restricts communication from each conference terminal 3' to the conference server 2', so that security risks such as leaking the presentation material to the third party and invading Intranet through a conference terminal 3' can be reduced.

The remaining related techniques (e.g., Non-Patent Literatures 1 and 2) allows multiple tablet computers connected through Wi-Fi (wireless LAN) to refer to the same file. In these techniques, any tablet computer connected through wireless LAN can be a communication master, and therefore any tablet computer can be the origin of the communication, which involves security risks.

These techniques assume that the tablet computers are connected to the same network through Wi-Fi and the access point is connected to an external network (Internet). For example, some companies use PC adopted to security authentication (i.e. locked) and provide means to access to outside of Intranet when an electronic conference to be held. Unfortunately, some terminal devices such as tablet computers are not security locked (undergo security authentication) due to the specifications thereof. Such terminal devices exemplified by tablet computers may fail to satisfy the security policy of a company if one wishes to use the devices for an electronic conference. In this case, such terminal devices are not used for cooperation and file sharing because the devices do not satisfy the security policy.

The second embodiment solves the above security risks because each conference terminal 3' is connected to the conference server 2' in the USB accessory mode.

As the above, the second embodiment can easily accomplish cooperation using multiple conference terminals 3', maintaining security.

(2-4) Modification to the Second Embodiment:

The cooperation assist system 1' of the second embodiment described as the above assumes that the cables 1a that connect the respective conference terminals 3 to the conference server 2' are USB cables, but the connecting manner is not limited to this. Alternatively, connection between each conference terminal 3' and conference server 2' may be via wireless communication using, for example, Bluetooth.

This modification differs from the second embodiment, which is adopting USB communication and having the configuration and operation depicted in FIGS. 13-22, in the point of adopting Bluetooth communication. However, the remaining configurations and operation of this modification are the same as those of the second embodiment, so repetitious description is omitted here.

The above configuration of this modification guarantees the same effects as the above second embodiment.

(3) Others:

Preferred embodiments and modifications thereof are described as the above. However, the present invention is not limited to the foregoing embodiments, and various changes and modifications can be suggested without departing from the gist of the present invention.

For example, the first and second embodiments and modifications thereof assume that the cooperation assist system 1 or 1' includes three tablet computers 3 or three conference terminals 3', but the number of computers or terminals is not limited to three. The number of tablet computers 3 or conference terminals 3' may be one, two, four or more.

The functions of the respective configurations depicted in FIGS. 2, 3, 8, 9, 13, and 14 may be arbitrarily combined or separated.

Part or the entire function of the cooperation assist system 1 or 1' of the first or second embodiment and the modification thereof may be achieved by the computer (including the conference server 2 or 2' and conference terminal 3 or 3') executing a predetermined program.

The above program is provided in the form of being stored in a computer-readable recording medium such as a flexible disk, a CD (e.g., CD-ROM, CD-R, and CD-RW), a DVD (e.g., DVD-ROM, DVD-RAM, DVD-R, DVD-RW, DVD+R, and DVD+RW), and Blu-ray disk. The computer reads the program from the recording medium and stores the program into an internal or external memory for future use.

Here, a computer is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium. The above program contains a program code that causes the above computer to carry out the respective functions of the conference server 2 or 2' and conference terminal 3 or 3' of the first and second embodiment and the modification thereof. Part of the functions may be achieved by the OS, not by an application program.

The technique disclosed herein can easily achieve cooperation using multiple terminal devices, maintaining the security.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising a processor that:

communicates with a terminal device using a first communication protocol represented by a first schema format;

generates a response including second information being described in a second schema format, in response to a request received from the terminal device using the first communication protocol, the second schema format corresponding to a second communication protocol, and the second communication protocol being different from the first communication protocol;

converts the second information being included in the response and being described in the second schema format into first information described in the first schema format corresponding to the first communication protocol; and transmits the response including the first information to the terminal device using the first communication protocol, wherein:

the first information described in the first schema format includes a character string that specifies a resource of first communication, the first communication using the first communication protocol; and the second information described in the second schema format includes a character string that specifies a resource of second communication identical to the resource of the first communication, the second communication using the second communication protocol.

2. The information processing apparatus according to claim 1, wherein the information processing apparatus functions as a master of communication that initiates the communication in the first communication protocol.

3. The information processing apparatus according to claim 2, wherein:

the first communication protocol conforms to one of Universal Serial Bus (USB) and Bluetooth; and the second communication protocol conforms to Local Area Network (LAN).

4. The information processing apparatus according to claim 1, wherein the processor further accesses data stored in a memory region of the terminal device using the first communication protocol.

5. The information processing apparatus according to claim 4, wherein, when the response to the request includes a reference to the data stored in the memory region, the processor carries out control such that the terminal device browses the referred data stored in the memory region.

6. The information processing apparatus according to claim 1, wherein the request is issued from a browser of the terminal device based on information described in the first schema format.

7. The information processing apparatus according to claim 1, wherein the processor further recognizes a data format of the response, and when the data format recognized is a predetermined data format, carries out the converting.

8. The information processing apparatus according to claim 1, wherein the processor further attaches, to the request that the processor receives from the terminal device in the first communication protocol, third information indicating a response processor as a destination of the request, and outputs the request including the third information to the response processor, the third information being described in the second schema format, and the response processor configured to output the response.

9. The information processing apparatus according to claim 1, wherein:
the processor further transmits a signal that allows the terminal device to start communication in the first communication protocol to the terminal device; and
the terminal device transmits the request to the information processing apparatus after receiving the signal.

10. A terminal device comprising a processor that:
communicates with an information processing apparatus using a first communication protocol represented by a first schema format;
causes a browser to issue a request being destined for the information processing apparatus, the request being based on first information described in the first schema format corresponding to the first communication protocol, and the browser configured to communicate using a second communication protocol represented by a second schema format;
converts the first information described in the first schema format and included in the request from the browser, into a form that the information processing apparatus is recognizable as a request in the second communication protocol;
transmits the request including the converted first information to the information processing apparatus in the first communication protocol; and
receives a response to the request from the information processing apparatus in the first communication protocol, the response including information described in the first schema format, wherein:
the first information described in the first schema format includes a character string that specifies a resource of first communication, the first communication using the first communication protocol; and
the second information described in the second schema format includes a character string that specifies a resource of second communication identical to the resource of the first communication, the second communication using the second communication protocol.

11. The terminal device according to claim 10, wherein the converting is carried out in a lower layer than a layer that the browser belongs to.

12. A computer-readable recording memory having stored therein a control program for causing a computer to execute a process comprising:
communicating with a terminal device in a first communication protocol represented by a first schema format;
generating a response including second information being described in a second schema format, in response to a request received from the terminal device using the first communication protocol, the second schema format corresponding to a second communication protocol, and the second communication protocol being different from the first communication protocol;
converting the second information being included in the response and being described in the second schema format into first information described in the first schema format corresponding to the first communication protocol; and
transmitting the response including the first information to the terminal device using the first communication protocol, wherein:
the first information described in the first schema format includes a character string that specifies a resource of first communication, the first communication using the first communication protocol; and the second information described in the second schema format includes a character string that specifies a resource of second communication identical to the resource of the first communication, the second communication using the second communication protocol.

13. The computer-readable recording memory according to claim 12, wherein the first communication protocol causes the computer functions as a master that initiates communication in the first communication protocol.

* * * * *